(12) United States Patent
Ooms et al.

(10) Patent No.: US 7,846,550 B2
(45) Date of Patent: Dec. 7, 2010

(54) CURABLE SILOXANE COMPOSITION WITH MODIFIED SURFACE PROPERTIES

(75) Inventors: Marco Ooms, Hoogerheide (NL); Jos Delis, Bergen op Zoom (NL); Pierre Leveque, Hoeilaart (NL)

(73) Assignee: Momentive Performance Materials GmbH, Leverkusen (DE)

( * ) Notice: Subject to any disclaimer, the term of this patent is extended or adjusted under 35 U.S.C. 154(b) by 894 days.

(21) Appl. No.: 10/583,883

(22) PCT Filed: Dec. 22, 2004

(86) PCT No.: PCT/EP2004/053679

§ 371 (c)(1), (2), (4) Date: Apr. 26, 2007

(87) PCT Pub. No.: WO2005/063890

PCT Pub. Date: Jul. 14, 2005

(65) Prior Publication Data

US 2007/0275255 A1    Nov. 29, 2007

(30) Foreign Application Priority Data

Dec. 23, 2003 (EP) .................. 03104963

(51) Int. Cl.
- *B32B 9/04* (2006.01)
- *C08L 83/04* (2006.01)
- *C04B 41/49* (2006.01)

(52) U.S. Cl. ............ 428/447; 524/261; 524/861; 106/287.14

(58) Field of Classification Search ............ 428/447; 427/387; 524/261

See application file for complete search history.

(56) References Cited

U.S. PATENT DOCUMENTS

| | | | | |
|---|---|---|---|---|
| 3,527,655 A * | 9/1970 | Ballard | ....................... | 427/133 |
| 4,831,080 A * | 5/1989 | Blizzard et al. | ............. | 525/100 |
| 4,956,231 A * | 9/1990 | Cavezzan et al. | ........... | 428/343 |
| 5,037,886 A * | 8/1991 | Blizzard et al. | ............. | 525/105 |
| 5,073,422 A * | 12/1991 | Konno et al. | ............... | 428/40.7 |
| 5,190,827 A * | 3/1993 | Lin | ........................... | 428/447 |
| 5,248,739 A | 9/1993 | Schmidt et al. | | |
| 5,308,887 A * | 5/1994 | Ko et al. | ..................... | 522/148 |
| 5,486,578 A * | 1/1996 | Carpenter et al. | ........... | 525/478 |
| 5,576,110 A * | 11/1996 | Lin et al. | .................... | 428/447 |
| 5,580,915 A | 12/1996 | Lin | | |
| 5,861,472 A | 1/1999 | Cifuentes et al. | | |
| 6,387,487 B1 * | 5/2002 | Greenberg et al. | ...... | 428/355 R |
| 6,703,120 B1 * | 3/2004 | Ko et al. | ................. | 428/355 R |
| 2002/0061998 A1 * | 5/2002 | Cray et al. | .................... | 528/32 |

OTHER PUBLICATIONS

International Search Report for PCT/EP2004/053679 dated Jun. 6, 2005, two pages.

\* cited by examiner

*Primary Examiner*—Randy Gulakowski
*Assistant Examiner*—Robert Loewe
(74) *Attorney, Agent, or Firm*—Rankin, Hill & Clark LLP

(57) ABSTRACT

The present invention relates to new curable siloxane compositions, and their use for the manufacture of cured products thereof having modified release properties. The modified release forces are achieved by incorporating a selected pressure sensitive adhesive additive.

15 Claims, No Drawings

CURABLE SILOXANE COMPOSITION WITH MODIFIED SURFACE PROPERTIES

The present invention relates to new curable siloxane compositions, and their use for the manufacture of cured products thereof having modified release properties.

Application of release coatings which are non-adherent to adhesives is well known in the coatings art. For example paper release coatings are used to release adhesives, e.g pressure sensitive adhesives, from labels, decorative laminates, transfer tapes etc.

Linear polydimethylsiloxanes provide, when crosslinked, easy release coatings. This means that an adhesive-laminated face stock may be detached with very little force required which is desired for many release applications.

However, in other application a higher release force is required. For example in laser printer application or at high speed converting machines, pre-dispensing has to be prevented by such a higher release level. Another example in which a higher release level is needed, is the usage in differential release liners wherein one side of the substrate is coated with a premium release silicone (low release forces) while the other side is coated with a tight (high release forces) release silicone layer.

Dependent on the application a wide range of release levels are required. The additives, which can be mixed into easy release silicones, and which can give the tight or modified release characteristics are the so called Controlled Release Additive (CRA).

Well known types of CRA's used in thermal curing release coatings are the OH— (U.S. Pat. No. 2,895,544, DE 15 46 410) or vinyl-functionalized siloxane MQ-resins. U.S. Pat. No. 3,527,659 (Keil et. al.) mentions the use of an OH-functionalized MQ-resin in a mixture of OH-endblocked dimethylpolysiloxane and crosslinker which is applied as coating film out of solvent in a tin-cured reaction.

The use of vinyl-functionalized MQ-resins as a CRA (controlled release additive or modifier) applied without solvent is mentioned in U.S. Pat. No. 4,123,604 (Sandford). Less used in the industry, but, however, described in EP 0640664 (Armstrong et. al.) is the use of SiH-functionalized MQ-resins as a CRA in paper release emulsion. Another approach to increase the release force of high release coatings is to change the crosslink density or bulk modulus of these release coatings. It is described in U.S. Pat. No. 5,281,656 (Thayer et. al.) to use chain extenders like SiH end-stopped polymers and/or Si-Vinyl end-stopped polymers that can increase the release force at higher strip speed.

EP-A-400614 discloses a polyorganosiloxane composition for the formation of a peelable cured coating comprising an alkenyl organopolysiloxane, an organohydrogenpolysiloxane and a solid polyorganosiloxane resin which is soluble in an organic solvent and consists of $R_3SiO_{1/2}$ (M) units, $R_2SiO_{2/2}$ (D) units or $RSiO_{3/2}$ (T) units and $SiO_{4/2}$ (Q) units, where R represents a monovalent hydrocarbon group, with each molecule having at least two alkenyl groups, and further components. In the description the solid polyorganosiloxane resin is defined to have a molar ratio of $R_3SiO_{1/2}$ units to $R_2SiO_{2/2}$ units or $RSiO_{3/2}$ units to $SiO_{4/2}$ units of 0.1 to 1.5: 0.1 to 1.0:1.0. In the examples these polyorganosiloxane resins comprise only M, T and Q units, that is, they are highly branched resin molecules.

The release force modifying resins of EP-A-400614 are produced by cohydrolysis or other polymerisation processes wherein all monomeric precursors of the siloxy units are mixed together before the polymerisation step.

Accordingly they do not possess outstanding pressure sensitive adhesive properties, and the efficacy of the decrease in release properties is insufficient.

A further disadvantage of using above described MQ-resin types is that they slow down the cure rate of mixes containing premium release silicones, because they must be used in high concentrations. Low curing rates has to be regarded as disadvantage, since coating machines are running faster and faster. Another problem, which current MQ-resin types show when used as a CRA, is the efficiency and the release response dependent on the amount of CRA used in the silicone bath.

Normally a very low release response is observed up to a CRA-loading level of 20% in the silicone composition. At higher loadings the release force increases exponentially. A more ideal situation would be preferred if the release response shows a linear relationship with respect to the loading level of the CRA.

In addition to above mentioned effect on cure speed the use of higher loadings of CRA has a negative effect on other coating properties like the anchorage of the silicone coating on the substrate, the coverage of the substrate by the silicone coating and on the processing of the silicone on the coating machine.

Surprisingly the above mentioned negative effects can be solved with a new curable siloxane composition, which provides a curable siloxane composition as a release film, with a different type of a release modifier. Within this siloxane composition one can adjust the release properties for all kind of adhesives by a small amount of an modifying additive. The negative effects of compositions with a high level of known CRA composition can be avoided.

EP-A2-1070734 discloses silicone release compositions, containing a specific unsaturated branched siloxane as the binder matrix polymer. The document also mentions also the possibility of using a silicone release modifier, for example an alkenylated silicone resin or an alkenylated polydiorganosiloxane, without indicating them more specifically. In the examples no release modifiers are used.

Accordingly the object of the present invention is to provide a curable siloxane composition, which provides upon curing a release layer or film with improved modified release properties on such substrates such as engineering paper, asphalt package paper, different releasing double-surface peeling paper, etc., as well as tapes, labels, etc., which require an appropriate level of releasing property. A further object of the invention is to provide a curable siloxane composition having a cure rate close to the base system without a release control additive and which provides a more linear relationship between the release force and the concentration of a modifying additive.

SUMMARY OF THE INVENTION

Accordingly the present invention provides a curable siloxane composition comprising:

A) at least one reactive siloxane polymer, wherein the content of the T- and Q-units if present does not exceed 10 mol-% of all siloxy units, B) optionally at least one siloxane cross-linking agent, C) at least one component selected from the group of a catalyst, a sensibilizer and a radical initiator, D) at least one pressure sensitive adhesive, with the proviso that if the pressure sensitive adhesive is an organosilicone compound, the content of the T- and Q-units is more than 10 mol-% of all siloxy units, the content of D-units is more than 10 mol-% of all siloxy units, and at least 90 mol-% of the organo groups in the organosilicone compound are alkyl groups, E) optionally auxiliary additives, and F) optionally solvents.

DETAILED DESCRIPTION OF THE INVENTION

The curable siloxane base polymers, crosslinkers, catalysts and additives for such release compositions can be described as follows.

The inventive composition comprises at least one reactive siloxane polymer A) which is suitably selected from A1) SiOH-terminated polydimethylsiloxanes, A2) alkenyl-containing polyorganosiloxanes and A3) photocurable polyorganosiloxanes.

The polymers of type A1) contains groups which can undergo condensation reactions, because the reactive groups of A1) are condensable with one another or can react with other reactive, i.e. hydrolysable leaving groups like alkoxy, aryloxy, alkylcarboxy, amino, amido groups attached to silicon and the like. The preferred group are SiOH groups, preferably as terminal group. The inventive polymers A1) with reactive groups linked to silicon are preferably SiOH-terminated polydimethylsiloxanes A1) including suitably at least terminal groups of the type of $HOMe_2Si$-units. Such polymers are disclosed for example in U.S. Pat. No. 3,527,659, DE 15 46 410, DE 21 35 673 or DE 27 48 406 or U.S. Pat. No. 3,579,469.

The polymer A1) or mixtures thereof comprises groups selecting from $M=R^1R_2SiO_{1/2}$, $D=R^1RSiO_{2/2}$, $T=R^1SiO_{3/2}$, $Q=SiO_{4/2}$ and divalent $R^3$-groups wherein $R^1$ is selected from hydroxy, monovalent n-, iso-, tertiary- or cyclo-$C_1$-$C_{22}$ alkoxy, carboxy, oximo, alkenoxy, amino, amido $C_6$-$C_{14}$ arlyoxy, and R R is selected from n-, iso-, tertiary- or $C_1$-$C_{30}$ alkyl, alkenyl, alkoxyalkyl hydrocarbons, $C_5$-$C_{30}$ cyclic alkyl, cyclic alkenyl or, $C_6$-$C_{30}$ aryl, alkylaryl, which can be substituted by one or O-, N-, S- or F-atom, e.g. ethers or amides or $C_2$-$C_4$ polyethers with up to 1000 polyether units.

Examples of said monovalent residues R in component A1) include hydrocarbon groups and halohydrocarbon groups.

Examples of suitable monovalent hydrocarbon radicals include alkyl radicals, preferably such as $CH_3$—, $CH_3CH_2$—, $(CH_3)_2CH$—, $C_8H_{17}$— and $C_{10}H_{21}$—, cycloaliphatic radicals, such as cyclohexylethyl, limonenyl, aryl radicals, such as phenyl, tolyl, xylyl, aralkyl radicals, such as benzyl and 2-phenylethyl.

$R^3$ divalent aliphatic or aromatic n-, iso-, tertiary- or cyclo-$C_1$-$C_{14}$ alkylen, arylen or alkylenaryl groups which bridges additionally siloxy units and does not exceed 30 mol. % of all siloxy units.

Examples of suitable divalent hydrocarbon groups $R^3$ include any alkylene residue, preferably such as —$CH_2$—, —$CH_2CH_2$—, $CH_2(CH_3)CH$—, —$(CH_2)_4$—, —$CH_2CH(CH_3)$ $CH_2$—, —$(CH_2)_6$— —$(CH_2)_8$— and —$(CH_2)_{18}$—; cycloalkylene radical, such as cyclohexylene; arylene radical, such as phenylene, xylene and combinations of hydrocarbon radicals, such as benzylene, i.e. —$C_6H_4CH_2$—. Preferred groups are alpha, omega-ethylene, alpha, omega-hexylene or alpha, omega-phenylene.

Examples of suitable divalent halohydrocarbon radicals $R^3$ include any divalent hydrocarbon group wherein one or more hydrogen atoms have been replaced by halogen, such as fluorine, chlorine or bromine. Preferable divalent halohydrocarbon residues have the formula —$CH_2CH_2C_nF_{2n}CH_2CH_2$— wherein n has a value of from 1 to 10 such as, for example, —$CH_2CH_2CF_2CF_2CH_2CH_2$—.

Examples of suitable divalent hydrocarbon ether radicals and halohydrocarbon ether radicals include —$CH_2CH_2OCH_2CH_2$—, —$CH_2CH_2CF_2OCF_2CH_2CH_2$—, —$CH_2CH_2OCH_2CH_2CH_2$— and —$C_6H_4$-0-$C_6H_4$—.

This means the polymer A1) can be described by the ratios of the general formula (I), $$[M_aD_bT_cQ_d]_m \quad (I)$$

wherein the siloxy units M, D, T and Q can be distributed blockwise or randomly in the polymer chain. Within a polysiloxane chain each siloxane unit can be identical or different and m=1-5000 a=1-10 b=0-12000 c=0-50 d=0-1 and these indices should represent the average polymerisation degree $P_n$ based on the average number mol weight $M_n$.

The T- and Q-units if present in the component A), in particular, component A1) do not exceed 10 mol. % of all siloxy units. This means the polymer is preferably a linear, flowable fluid or gum with a Newton like viscosity but not solid at 25° C.

The siloxane units with radicals R or $R^1$ can be equal or different for each silicon atom. Each molecule can bear one or more groups independently. In a preferred version the structure is represented by the general formulas (Ia) to (Ib)

$R^1R_2SiO(R^1RSiO)_bSiR_2R^1$ (Ia)

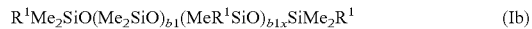
$R^1Me_2SiO(Me_2SiO)_{b1}(MeR^1SiO)_{b1x}SiMe_2R^1$ (Ib)

b=>0-12000 b1=>0-12000 b1x=0-1000 b1+b1x=b

Preferred groups for R are methyl, phenyl, 3,3,3-trifluoropropyl

Preferred groups for $R^1$ are hydroxy, methoxy, ethoxy and acteoxy.

The average polymerization degree Pn or 'b' is based on Mn as average number mol weight in the range of up to 12000, the preferred range is 500 to 5000. The viscosity of such polymers are in the range of 10 to 50,000,000 mPa·s at 25° C. at a shear rate of D=1 $s^{-1}$, the preferred range is about 200 to 10,000,000 mPa·s.

The alkenyl-containing polyorganosiloxane A2) are preferably a vinyl terminated polyorganosiloxane or mixtures thereof as disclosed e.g. in U.S. Pat. No. 6,387,487 following the general formula (I) composed out of siloxane units selected from $M=R^2R_2SiO_{1,2}$, $D=R^2RSiO_{2/2}$, $T=R^2SiO_{3/2}$, $Q=SiO_{4/2}$ and divalent R3-groups with the same limitations of the concentration and distribution of the siloxy units as defined for the polymer A1) wherein in A2)

R is defined above $R^2$ is R or is selected from n-, iso-, tertiary- or cyclic $C_2$-$C_{30}$ alkenyl, vinyl, $C_6$-$C_{30}$-cycloalkenyl, cycloalkenylalkyl, norbornenyl-ethyl, limonenyl, $C_8$-$C_{30}$-alkenylaryl, substituted by one or more O- or F-atoms, e.g. ethers, amides or $C_2$-$C_4$ polyethers with up to 1000 polyether units.

$R^3$ are divalent group as defined above.

Preferred examples for $R^2$ are radicals such as vinyl, allyl, methallyl, 3-butenyl, 5-hexenyl, 7-octenyl, cyclohexenyl-ethyl, limonenyl, norbornenylethyl, ethylidennorbornyl and styryl. Alkenyl radicals are preferable attached to terminal silicon atoms, the olefin function is at the end of the alkenyl group of the higher alkenyl radicals, because of the more ready availability of the alpha, omega-dienes used to prepare the alkenylsiloxanes. Preferable monovalent halohydrocarbon radicals have the formula $C_nF_{2n+1}CH_2CH_2$— wherein n has a value of from 1 to 10, such as, for example, $CF_3CH_2CH_2$—, $C_4F_9CH_2CH_2$— and $C_6F_{13}CH_2CH_2$—.

Preferred groups for R are methyl, phenyl, 3,3,3-trifluoropropyl.

Preferred groups for $R^2$ are vinyl, 5-hexenyl.

The preferred groups of R3 are ethylene, hexylene or phenylene as above.

Such polymers containing R, $R^2$ and $R^3$ radicals are polyorganosiloxanes, e.g. alkenyl-dimethylsiloxy or trimethylsiloxy terminated polydimethylsiloxanes, poly-(dimethyl-co-diphenyl)siloxanes, which can contain other siloxane units like alkenylmethylsiloxy groups. The polymers A2) are single polymers or mixtures thereof. Broadly stated component A2) of the compositions of this invention can be also any organosilicon compound containing two or more silicon atoms linked by oxygen or divalent groups $R^3$ wherein the silicon is bonded to 1 to 3 monovalent groups per silicon, with the proviso that the organosilicon compound contains at least two silicon-bonded olefinic hydrocarbon residues. This component can be a solid or a liquid, free flowing or gum-like i.e. it has measurable viscosity of less than 500 kPa·s at a shear rate of D=1 s$^{-1}$ at 25° C.

One preferred polyorganosiloxane component A2) for the composition of this invention is a substantially linear polyorganosiloxane having the formula (IIa) or (IIb). The expression substantially linear includes polyorganosiloxanes that contain not more than 0.2 mol. % (trace amounts) of silicon units of type defined under T or Q in before bearing 3 or 4 oxygen bonds.

$$R^2R_2SiO(R^2RSiO)_bSiR_2R^2 \quad \text{(IIa) or}$$

$$R^2Me_2SiO(Me_2SiO)_{b2}(MeR^2SiO)_{b2x}SiMe_2R^2 \quad \text{(IIb)}$$

wherein $R^2$ is defined as above and b=(b2+b2x)<12000 b2>0-12000 b2x 0-2000.

The preferred value of b2x if R2 is an unsaturated group is typically less than 0.1 b2 such as zero. If b2x is not zero then it is preferably between 0.005 b2 to 0.08 b2 preferably 0.008 to 0.04 b2. Examples of highly preferred linear polyorganosiloxanes A2) for adhesive-release coating compositions of this invention include $$Me_3SiO(Me_2SiO)_{b2}(MeHexSiO)_{b2x}SiMe_3 \quad \text{(II c),}$$

$$Me_3Si(Me_2SiO)_{b2}(MeViSiO)_{b2x}SiMe_3 \quad \text{(II d),}$$

$$HexMe_2SiO(Me_2SiO)_{b2}(MeHexSiO)_{b2x}SiMe_2Hex \quad \text{(II e) and}$$

$$ViMe_2SiO(Me_2SiO)_{b2}(MeViSiO)_{b2x}SiMe_2Vi \quad \text{(II f).}$$

Vi=vinyl

Hex=5-hexenyl

The value for the polymerization degree of (b1+b2x) in the highly preferred polyorganosiloxane A2) is sufficient to provide a viscosity at 25° C. for the component A2) which is suitable for the application in introduced coating processes.

Preferred structures according of the formulas (IIg) to (IIa) achieve suitable viscosities as defined later on and describe polymers applicable without any solvent for a viscosity adjustment The range of subindices defines a range of the possible average polymerization degrees $P_n$.

$$PhMeViSiO(Me_2SiO)_{10-500}SiPhMeVi \quad \text{(II g),}$$

$$HexMe_2SiO(Me_2SiO)_{10-500}SiMe_2Hex \quad \text{(II h),}$$

$$ViMe_2SiO(Me_2SiO)_{10-500}(HexMeSiO)_{1-50}SiMe_2Vi \quad \text{(II i),}$$

$$ViMe_2SiO(Me_2SiO)_{10-500}(MeViSiO)_{1-50}SiMe_2Vi \quad \text{(II j),}$$

$$HexMe_2SiO(Me_2SiO)_{10-500}(HexMeSiO)_{1-50}SiMe_2Hex \quad \text{(II k),}$$

$$Me_3SiO(Me_2SiO)_{10-500}(MeViSiO)_{1-50}SiMe_3 \quad \text{(II l),}$$

$$Me_3SiO(Me_2SiO)_{10-500}(MeHexSiO)_{1-50}SiMe_3 \quad \text{(II m),}$$

$$PhMeViSiO(Me_2SiO)_{10-500}(MePhSiO)_{1-100}SiPhMeVi \quad \text{(II n) and}$$

$$ViMe_2SiO(Me_2SiO)_xSiMe_2Vi \quad \text{(II o)}$$

wherein Ph=phenyl

Another class of preferred polymers are branched polyorganosiloxanes with distinct cure rates or low release forces. Branched paper release polymers are described e.g. in U.S. Pat. No. 5,616,672 and are preferably selected from those of the formula $$M^{vi}{}_{a1}M_aT_{c1}T^{vi}{}_{c2}D_{b2}D^{vi}{}_{b2x} \quad \text{(III)}$$

wherein $M^{vi}=R_{3-p}R^2{}_pSiO_{1/2}$, where

R and $R^2$ are selected from the group defined above and p is in the range from 1 to 3, preferred 1

M is $R_3SiO_{1/2}$ where each R is as previously defined and is independently selected T or $T^{vi}$ are $R^2SiO_{3/2}$ wherein $R^2$ is selected from the group defined above D or $D^{vi}$ is $R^2RSiO_{2/2}$ where $R^2$ and R are each independently selected from that group defined in before wherein a1=0 to 5 a=0 to 5 c1 or c2=to 10, b2 or b2x=b* wherein each b* is an integer ranging from about 50 to about 1000.

All the residues R and $R^2$ are selected from the group as defined in before.

The polyorganosiloxane A2) comprising alkenyl groups can have more or less minor amounts of T=$RSiO_{3/2}$- or Q=$SiO_{4/2}$-units. If present in those embodiments with more than 0.2 mol. % then this concentration is nevertheless small compared to the amount of D-units and will be in in the range of D:Q or D:T>10:1 preferably >33:1.

The alkenyl-containing polydiorganosiloxanes A2) can be prepared by any of the conventional methods for preparing triorganosiloxane-terminated polydiorganosiloxanes. For example, a proper ratio of the appropriate hydrolyzable silanes, e.g., vinyidimethylchlorosilane and dimethyldichlorosilane, may be co-hydrolyzed and condensed or alternately an appropriate 1,3-divinyltetraorganodisiloxane, e.g., symmetrical divinyidimethyldiphenylsiloxane or divinyltetramethylsiloxane, which furnishes the endgroups of the polydiorganosiloxane, may be equilibrated with an appropriate dipolyorganosiloxane, e.g., octamethylcyclotetrasiloxane, in the presence of an acidic or basic catalyst. Regardless of the method of preparation of polydiorganosiloxane A2), there is usually coproduced a varying quantity of volatile, cyclic polydiorganosiloxanes. Volatile cyclic polydiorganosiloxane, e.g., mainly the methyl tetramer, that should be removed, since they are volatile and adversely affect properties responsible for high release forces.

polyorganosiloxanes, which are frequently co-produced by polymerization processes like equilibration of polyorganosiloxanes, which can contain up to about 15 percent by weight of cyclosiloxanes in that stage if these volatiles of the polymers are not separated. Generally it is preferred to have a lower concentration of such low boiling cyclosiloxanes in the release polymers after further evaporation steps. The polydiorganosiloxanes A2) defined above, and its viscosity, for the purposes of this invention, refer to the essentially cyclic free (less than 1 wt. %, preferably 0.5 wt. % measured after 1 h 150° C. 20 mbar) portion of the polyorganosiloxane. This essentially cyclic free portion can be prepared by stripping all the polydiorganosiloxane at 150° C. for 3 hours to yield a polymer residue of this type. This residue will be essentially free of cyclic material with the exception of trace quantities of macrocyclic polydiorganosiloxanes (mol weight>518) which are nonvolatile as defined above. Many of these polydiorganosiloxanes A2) are commercially available. Furthermore the components A2) can be homopolymers or copolymers or their several mixtures as long as they are alkenyl-containing polysiloxanes of the definition under A2).

In preferred embodiment of the invention the amount of low boiling cyclosiloxanes are limited and are defined by vapour pressure and viscosity of the desired polyorganosiloxanes.

The viscosity can be adjusted also by the polymerization degree Pn and substituents R at each silicon atom.

The average polymerization degree $P_n$ measured by GPC measured versus polystyrene standard based on the average number mol weight Mn is in the range of >0 to 12000, the preferred range is 25 to 5000, more preferably is the range of 25 to 500. The viscosity of such polymers are in the range of 25 to 50,000,000 mPa·s at 25° C. at a shear rate of D=1 s$^{-1}$. The value for $P_n$ or the index 'b' in the above formula (IIa) is such that the linear polyorganosiloxane A2) has a viscosity at 25° C., of at least 25 mPa·s. The exact value of $P_n$ that is needed to provide a viscosity value falling within said limit depends upon the identity of the $R^2$ and R radicals, however, for triorganosiloxy terminated polydimethylsiloxane 'b' or (b2+b2x) have a value of at least about 25. Preferably the range of the viscosity is from about 30 mPas to about 10,000,000 mPa·s, preferably from about 50 mPa·s to 100,000 mPa·s and, most preferably from 100 mPa·s to 5,000 mPa·s. Said viscosity corresponds approximately to the values of the average Pn, indicated by 'b' or 'b2+b2x'.

The concentration of the functional unsaturated groups are in the range of 0.02 to 0.8 mmol/g, more preferred 0.1-0.4 mmol/g.

Said siloxane units can be combined in any molecular arrangement such as linear, branched, cyclic and combinations thereof, to provide polyorganosiloxanes that are useful as component A2).

In a preferred embodiment of the present invention, wherein the curable composition A2) is preferably solventless, it is used to coat a solid substrate, such as paper, fabrics or thermoplastic films, with an adhesive-releasing layer or to make any cured coating or shaped article with surface having modified release proper-ties.

All these polymers can be used with or without appropriate organic solvents as single component or in mixture of different types of A2)

A third alternative for reactive polyorganosiloxane polymers are photocurable or photoactivatable polymers. Photocurable means that the mixture of polymer A3) and an optional crosslinker B3), catalyst C3) and sensitizer C3) can be cured under UV-light, daylight or by X-ray or other electron beam processes. An overview is given in J. E. Thompson; J. Cavezzan at RadTech '92 North Am. UV/EB Conf. Expo., Conf. Proc. 1992, 1, 212-20 Rad Tech Int. North Am.: Northbrook, Ill.

Such polymers could be in some cases the same as polymer A2) but the preferred candidates of this polymer type are polymers suitably selected from epoxyalkyl-, alkenyloxy, mercaptoalkyl or all types of methylacryloxy- or acryloxy-modified hydrocarbons linked to silicon by Si—C or SiO-bonds, such as methylacryloxy- or acryloxyalkyl-group containing siloxanes.

Such system are disclosed e.g. by U.S. Pat. No. 4,678,846. Weitemeyer et al. describes acrylate or methacrylate ester modified polyorganosiloxane mixtures, which can be used by themselves or in admixtures with other unsaturated compounds as radiation-curable coating compositions to obtain "good dehesive or abhesive properties towards adhesives.". The EP 058909 A1 discloses a radiation-curable composition containing liquid polyorganosiloxane having unsaturated groups, photosensitizer, and, optionally a vinyl monomer. The composition is used for the production of release coatings and is especially useful for coating paper.

U.S. Pat. No. 4,558,082 (Eckberg) describes photocurable acrylated silicone polymers prepared by reacting limone-neoxide-functional silicones with acrylic acid or a substituted acrylic acid in the presence of a catalyst.

EP 0284863, EP 0254799 and EP 0336141. These patents describe polyorganosiloxanes with acrylic acidester as side groups, which are synthesized e.g. by a reaction of epoxy-functional siloxanes with acrylic add. These acryloxysiloxanes are curable by radiation. In alternative version acryloxy modified polysiloxanes can also be synthesized by transesterification.

U.S. Pat. No. 5,412,133 and U.S. Pat. No. 4,595,471 disclose the use of mercapto groups as photoreactive groups for polysiloxanes.

In WO 95/25735, WO95/25734 photoactivatable platinum catalysts are described for the use in polymer systems based on polyorganosilxanes A2) and B2).

U.S. Pat. No. 4,201,808 discloses radiation-curable release coating compositions, most commonly for paper substrates containing from about 90 to 10 weight percent of a low molecular weight acrylated polyol crosslinking agent, and from 0 to about 10 weight percent of a photosensitizer. U.S. Pat. No. 4,070,526 discloses radiation-curable compositions comprising mercaptoalkyl-substituted polydiorganosiloxane. U.S. Pat. No. 4,783,490 (Eckberg) discloses UV-curable compositions comprising mercapto-substituted silicon compounds, reactive co-compounds such as multifunctional acrylates, and a photoinitiator.

The EP 159683 A1 describes an electron beam-curable liquid release coating composition comprising from 60 to 95 parts functionalized polyorganosiloxane, e.g., an acrylated polyorganosiloxane.

U.S. Pat. No. 4,608,270 discloses coating compositions comprising polydiorganosiloxanes which contain one or more acryloylamino-substituted hydrocarbon radicals.

These compositions are radiation-polymerizable to form release coatings and may optionally include polymerizable vinyl monomers.

U.S. Pat. No. 4,576,999 and U.S. Pat. No. 4,640,967 describe epoxy- and/or acrylic-functional polysiloxanes which, when combined with appropriate catalysts, form ultraviolet radiation-curable release coating compositions. It is stated that cure performance and substrate adhesion may be enhanced by the addition of up to 10 parts of an aliphatic non silicon monomer for every 10 parts epoxysiloxane polymer.

All these patents are given as reference to describe the variety of useful systems for photocuring processes.

The organofunctional polyorgansiloxanes A3) having the ability to be photo-curable with itself or in the presence of another polymer referred under B3) The polyorgansiloxane A3) comprises groups selected from Q-, M-, D- and T-groups, wherein at least more than one M-, D- or T-group contain at least one photoreactive or photoactivatable group such as epoxy-, acryl-, methacryl, acrylurethane, vinylether- or mercaptoorgano group (see for example EP 599615 A1).

The organofunctional polyorgansiloxanes A3) can contain organofunctional side group attached to silicon in the siloxane chain or terminated polydimethylsiloxanes as disclosed e.g. in U.S. Pat. No. 5,814,679 comprising units selected from following the general formula (I) composed out of siloxane units selected from $M=R^4R_2SiO_{1/2}$, $D=R^4RSiO_{2/2}$, $T=R^4SiO_{3/2}$, $Q=SiO_{4/2}$ and divalent groups of $R^3$ with the same limitations of the concentration and distribution of the siloxy units as defined for polymer A1).

wherein $R^4$ is $R^2$ or R or selected from the group of n-, iso-, tertiary- $C_1$-$C_{30}$ alkyl, alkenyl, $C_4$-$C_{30}$ cycloalkyl, cycloalkenyl, $C_8$-$C_{30}$ alkenylaryl residues having oxetane, epoxy, epoxy-alkyl-, vinylether-, furanyl, mercapto-organo or all types of methylacryloxy- or acryloxy-modified hydrocarbon and acrylurethane group or substituents such as methylacryloxy-, acryloxyalkyl-groups substituted by one or more O-, N-, P- or F-atom, including $C_1$-$C_4$-polyethers with up to 1000 units.

R is defined as above $R^3$ are divalent groups as defined above,

Such polymers contain $R^4$ as photoreactive group. Therefore $R^4$ is selected from the group of monovalent epoxy-functional organic radicals of $C_2$-$C_{30}$ atoms such as glycidyloxypropyl, oxylimonenyl, vinyloxycyclohexyl, cyclohexenyloxyethyl, mercatopropyl, oxynorbornenyl, alkenylalkylethers, vinylethers, acryloxyalkyl-, methacryloxyalkyl, phenyl, vinyl, allyl, methallyl, 3-butenyl, 5-hexenyl, 7-octenyl and cyclohexenyl.

Photoactivatable organofunctional radicals are preferably attached to terminal silicon atoms of A3). The polyorganosiloxanes A3) and their isomers are e.g. preferably reactions products of a metal catalysed hydrosilylation reaction between SiH-silanes or SiH-polyorganosiloxanes and photoactivatable olefins such as preferably unsaturated epoxides including limoneneoxide, 4-vinyl-cyclohexeneoxide (VCHO), allylglycidylether, glycidylacrylate, 1-methyl-4-iso-propenyl cyclohexeneoxide, 7-epoxy-1-octene, 2,6-dimethyl-2,3-epoxy, epoxy-7-octene, vinyinorbornenemonoxide, dicyclopentadienemonoxide, corresponding diolefins and the like. Most preferably, 4-vinylcyclohexene oxide is used as the olefinic epoxide in the process of the invention, as disclosed in U.S. Pat. No. 3,814,730; U.S. Pat. No. 3,775,452 and U.S. Pat. No. 3,715,334 or epoxysiloxanes reacted with acrylic acid as described in DE 30 44 237.

Examples for photocurable systems are also disclosed in U.S. Pat. No. 5,593,787.

The organofunctional photoactivatable groups are introduced by equilibration, condensation or polymer analogical reactions (hydrosilylation) with other siloxane units to yield preferably polydimethylsiloxane, e.g. epoxyalkyl-dimethyl siloxy terminated polydimethylsiloxanes, poly(dimethyl-co-diphenyl)siloxanes or epoxy-alkyl-methylsiloxy group containing polydimethylsiloxanes or poly(dimethyl-co-methylphenyl) siloxanes or mixtures thereof.

Preferred groups for R are methyl, phenyl, 3,3,3-trifluoropropyl.

Preferred groups for $R^4$ are vinyl, 5-hexenyl, 4-epoxycyclohexylethyl, glycidyl-oxypropyl, acryloxypropyl or 3-mercaptopropyl.

Another class of useful polymers are branched polyorganosiloxanes A3) as defined under A2).

Broadly stated component A3) of the compositions of this invention can be also any organosilicon compound containing two or more silicon atoms linked by oxygen or divalent bridging groups $R^3$ wherein the silicon is bonded to 1 to 3 monovalent groups per silicon, with the proviso that the organosilicon compound contains at least two silicon-bonded photoreactive or activatable organofunctional hydrocarbon groups. This component can be a solid or a liquid, free flowing or gumlike at 25° C.

Broadly stated component A3) of the compositions of this invention are organo functional polyororganosiloxane compounds containing two or more silicon atoms with a photoreactive group $R^4$.

Beside the reactive groups of $R^4$ the compound A3) can be composed of all other siloxane units defined in A2).

One preferred polyorganosiloxane component A3) for the composition of this invention is a substantially linear polyorganosiloxane having the formula (IIa) or (IIIb). The expression substantially linear includes polyorganosiloxanes that contain not more than 0.2 wt. % (trace amounts) of silicon units of the type defined under T or Q in before bearing 3 or 4 oxygen bonds.

$R^4R_2SiO(R^4RSiO)_qSiR_2R^4$ (IIIa) or $R^4Me_2SiO(Me_2SiO)_r(MeR^4SiO)_sSiMe_2R^4$ (IIIb)

wherein $R^4$ is defined as above and q=s+r=>0-2000 r>0-2000 s 0-1000 wherein $R^4$ is noted above and the sum of (r+s) is equal to q, also noted above. The values of the index r and s can each be zero or greater. Examples of highly preferred linear polyorganosiloxanes A3) for adhesive-release coating compositions of this invention include $Me_3SiO(Me_2SiO)_r(MeR^4SiO)_sSiMe_3$ (III c), $Me_3Si(Me_2SiO)_r(MeR^4SiO)_sSiMe_3$ (III d), $R^4Me_2SiO(Me_2SiO)_r(MeR^4SiO)_sSiMe_2R^4$ (III e) and $R^4Me_2SiO(Me_2SiO)_r(MeR^4SiO)_sSiMe_2R^4$ (III f).

The value for the polymerization degree of (r+s) in the highly preferred polyorganosiloxane A3) is sufficient to provide a viscosity at 25° C. for the component A3), which is suitable for the application in the introduced coating processes.

Preferably the range of the viscosity is from about 25 mPas to about 100,000 mPa·s, preferably from about 50 mPa·s to 50,000 mPa·s at 25° C. and, most preferably from 100 mPa·s to 10,000 mPa·s. Said viscosity corresponds approximately to the values of the average Pn, indicated by 'q' or 'r+s'.

The concentration of functional photoreactive groups are in the range of 0.05 to 1.2 mmol/g more preferred 0.5-1.0 mmol/g.

Preferred structures according of the formulas (IIIg) to (IIIm) achieve suitable viscosities as defined later on and describe polymers applicable without any solvent for an viscosity adjustment $$PhMeR^4SiO(Me_2SiO)_{10\text{-}500}SiPhMeR^4 \quad (IIIg),$$

$$R^4Me_2SiO(Me_2SiO)_{10\text{-}500}SiMe_2R^4 \quad (IIIh),$$

$$R^4Me_2SiO(Me_2SiO)_{10\text{-}500}(R^4MeSiO)_{1\text{-}50}SiMe_2R^4 \quad (IIIi),$$

$$Me_3SiO(Me_2SiO)_{10\text{-}500}(R^4MeSiO)_{1\text{-}50}SiMe_3 \quad (IIIj),$$

$$Me_3SiO(Me_2SiO)_{10\text{-}500}(R^4MeSiO)_{1\text{-}100}SiMe_3 \quad (IIIk),$$

$$PhMeR^4SiO(Me_2SiO)_{10\text{-}500}(MePhSiO)_{10\text{-}100}SiPhMeR^4 \quad (IIIL) \text{ and}$$

$$R^4Me_2SiO(Me_2SiO)_qSiMe_2R^4 \quad (IIIm)$$

wherein $R^4$ is defined above

All the residues R and $R^4$ are selected from the group defined in before.

In an other embodiment of the invention the polyorganosiloxane A3) comprising photoreactive groups can also contain an limited amount of $T=R^4SiO_{3/2}$ or $Q=SiO_{4/2}$-units which is higher than 0.2 mol. %. In such cases this concentration is always still small compared to the amount of D-units and will be in the range of D:Q=>10:1 and preferably of D:Q=>33:1.

The organofunctional group containing polydiorganosiloxanes A3) can be prepared by any conventional methods for preparing such polydiorganosiloxanes. The cited patents disclose a variety of alternatives how to introduce the photoreactive group $R^4$.

Such reactions include condensation of SiOH or SiOR containing molecules after hydrolysis of the corresponding organofunctional chlorosilane precursors, addition of unsaturated precursors bearing the photoreactive group to SiH-containing siloxanes via hydrosilylation or by an anionic or cationic catalyzed copolymerising equilibration of linear and/or of different cyclosiloxanes. For example see U.S. Pat. No. 4,370,358.

Many of these polydiorganosiloxanes A3) are commercially available. Further more, component A3) can be homopolymers or copolymers or their several mixtures as long as they are polyorganosiloxanes of the type A3) containing the photoreactive group of the definition under A3).

Many of these polydiorganosiloxanes A3) are commercially available e.g. at GE Bayer Silicones GmbH & Co KG Leverkusen, Dow Corning Barry UK, Rhodia SA 92512 Boulogne-Billancourt France or Goldschmidt Essen Germany.

All the characteristics for remaining cyclosiloxanes and the adjustment of an appropriate viscosity are described under A2) above.

In preferred embodiment of the invention the amount of low boiling cyclosiloxanes are limited and are defined by vapour pressure according to the preferred level in A2) and viscosity of the desired polysiloxanes. The viscosity can be adjusted also by the polymerization degree Pn.

The average polymerization degree $P_n$ measured by GPC versus polystyrene standards based on $M_n$ as average number mol weight is in same the range as defined under A2)

The concentration of functional photoreactive groups are in the range of 0.05 to 1.2 mmol/g more preferred 0.5-1.0 mmol/g.

Said siloxane units can be combined in any molecular arrangement such as linear, branched, cyclic and combinations thereof, to provide polyorganosiloxanes that are useful as component A3).

In a preferred embodiment of the present invention, wherein the curable component A3) is preferably solventless, it is used to coat a solid substrate, such as paper, fabrics or thermoplastic films, with an adhesive-releasing layer comprising the other ingredients of this invention or to make any cured coating or shaped article with surface having modified release properties.

All these polymers can be used with or without appropriate organic solvents as single component A3) or in a mixture of different types of A3)

The optionally used crosslinkers B) for the polymers defined under A), i.e A1) to A3) if used are silanes, siloxanes or organofunctional non-silicon molecules with at least 2 functional groups which could crosslink at least the polymers A) to a cured surface layer with modified release properties. In order to distinguish between release layers and adhesive layers the release layers here are defined to be crosslinked polyorganosiloxanes preferably used as thin film below 0.3 mm with a release force of less than 1000 cN/inch measured by FINAT FTM 3 test versus Tesa 7475 or Tesa 7476.

The polymers of the type A1) can be crosslinked by a crosslinker component of the type B1) or B2). The component B1) is selected from reactive $R^5$-containing polyorganosiloxanes and $SiR^5$-containing organosilanes.

The polymers A2) can be crosslinked by compounds of the type B2). Component B2) is selected from group of SiH-containing polyorganosiloxanes and SiH-containing organosilanes.

The polymers A3) can be crosslinked by a component B2) or by A3) itself. The component B3) is therefore selected from the group of A3) or B2).

The crosslinkers B1) enables preferably the cure of the polymers of the type A1) comprising groups to be reactive in the presence of catalysts and can undergo condensation reaction with the reactive groups of A1). These reactive groups of the category 1 are groups to participate in the main network building reaction together with the polymer A1).

The reactive hydrolysable residue $R^5$ in $SiR^5$ is selected from the group defined below.

Depending on the type of $R^5$ the reactive groups of A1) and B1) need additional traces of water which can be provided by the substrate or the environment such as ambient air.

Broadly stated, component B1) of the compositions of this invention is any reactive organosilicon compound with condensable groups $R^5$ that optionally contain one or more silicon atoms linked by divalent groups $R^3$.

The silicon atoms can comprise other additional groups R as long as the total molecule comprises more than 2 functional groups to be reactive with A1).

Examples of said divalent groups $R^3$ are defined above.

The crosslinkers are suitably composed of siloxane units selected from the groups $M=R_3SiO_{1/2}$, $M^*=RR^5SiO_{1/2}$, $D=R_2SiO_{2/2}$, $D^*=RR5SiO_{2/2}$, $T=RSiO_{3/2}$, $T^*=R^5SiO_{3/2}$, $SiO_{4/2}$, or of the general formula $R_eR^5{}_2SiOR_{(2-e)}$ wherein e=1 or 2 and R3.

This means the polymer B1) can be described by the ratios of the general formula (IV), $$[M_{a3}D_{b3}T_{c3}Q_{d3}]_m \quad (IV)$$

wherein the siloxy units can be distributed blockwise or randomly in the polymer chain. Within a polysiloxane chain each siloxane unit can be identical or different and m=1-2000
a3=1-10
b3=0-500
c3=0-50
d3=0-1 the afore mentioned indices should represent the average polymerisation degree based on the average number mol weight Mn.

The range for M-, D-, T- and Q-units present in the molecule can cover nearly all values representing fluids, flowable polymer, liquid and solid resins. It is preferred to use liquid silanes or siloxanes comprising $C_1$-$C_3$ alkoxy or Si-hydroxy groups having a low mol weight and their condensation products which can be partially hydrolysed.

The siloxane units with radicals R or $R^5$ can be equal or different for each silicon atom. Each molecule can bear one or more groups independently.

The preferred structures of reactive polyorganosiloxanes for component B1) in the compositions of this invention are silanes or condensed silanes/siloxanes of formula (IVa) to (IVd).

$$R^5{}_f Si(OR)_{(4-f)} \text{ wherein } f=0, 1, 2, 3 \text{ or } 4 \tag{IV a}$$

$$\{[SiO_{4/2}][R^9O_{1/2}]_{n1}\}_{m1} \tag{IV b}$$

$$\{[RSiO_{3/2}][R^9O_{1/2}]_{n1}\}_{m1} \tag{IV c}$$

$$\{[SiO_{4/2}][R^9O_{1/2}]_{n1}[R_2R^5SiO_{1/2}]_{0,01-10}[R^5SiO_{3/2}]_{0-50}[RR^5SiO_{2/2}]_{0-500}\}_{m1} \tag{IV d}$$

wherein $R^9O_{1/2}$ is an alkoxy or hydroxy residue at the silicon, preferably hydroxy, methoxy or ethoxy with the preferred indices
m1=1 to 100
n1=0.01 to 4
a3=0.01 to 10
b3=0 to 500
c3=0 to 50
d3=1
$R^3$ as defined in before
R as defined in before
$R^5$ is $R^1$ or hydroxy, hydrogen, n-, iso-, tertiary- or cyclo-$C_1$-$C_{25}$ alkoxy, such as methoxy, ethoxy, propoxy, carboxy, such acetoxy, alkylamido, benzamido, alkyloximo such as butanonoxime, alkenyloxy such as propenoxy, halogenhydrocarbon, halogen, pseudohalogen, arlyoxy containing silanes or siloxanes residue. The preferred groups for $R^5$ are hydroxy, methoxy, ethoxy or acetoxy alone or together in the same molecule.

The polymer B1) can be applied as single component or as mixture of different types of B1) with or without additional traces of water. Traces means 0.01 to 5 wt. % related to B1)

The molweight in B1) is smaller, the amount of functionality in B1) per molecule is higher than in A1).

The mol weight for the component B1) is not critical: however it is preferred such that the polyorganosiloxane component B1) has a viscosity at 25° C. up from 3 mPa·s, i.e 3 to 2000 mPa·s in the case of R=methyl. In addition the viscosity depends upon the identity of the R and $R^5$ substituents, however, for polyorganosiloxanes containing only methyl groups as R group the range of the molweights as Mn is between 136 and 100,000 g/mol. The crosslinker B1) should have at least more than 2 reactive groups $R^5$ per molecule.

The concentration of the reactive group $R^5$ is in the range of 0.5-70 mmol $SiR^5$/g, the preferred range is 2 to 68 mmol/g.

The ratio of the crosslinker B1) to polymer A1) can be calculated by the ratio of reactive groups in B1) and A1). It is preferred to have an excess of reactive groups B1):A1) of 1 to 20:1 to ensure a certain level of multifunctional structures in the cured network.

The polymers A2) can be crosslinked preferably by a crosslinker of the component B2). The component B2) is selected from SiH-containing polyorganosiloxanes and SiH-containing organosilanes, comprising the siloxane units $M=R_3SiO_{1/2}$, $M^*=R_2YSiO_{1/2}$, $D=R_2SiO_{2/2}$, $D^*=RYSiO_{2/2}$, $T=RSiO_{3/2}$, $T^*=YSiO_{3/2}$, $Q=SiO_{4/2}$.

This means the polymer B2) can be described by the ratios of the general formula (V), $$[M_{a4}D_{b4}T_{c4}Q_{d4}]_{m2} \tag{V}$$

wherein the siloxy units can be distributed blockwise or randomly in the polymer chain. Within a polysiloxane chain each siloxane unit can be identical or different and
m2=1 to 2000
a4=1 to 10
b4=0 to 1000
c4=0 to 50
d4=0 to 1 and these indices should represent the average polymerisation degree based on the average number mol weight.

The range for M-, D-,T- and Q-units present in the molecule can cover nearly all values representing fluids, flowable polymer, liquid and solid resins. It is preferred to use liquid siloxanes with a low mol weight, i.e. smaller than 1,000,000 g/mol, preferably smaller than 75,000 g/mol.

The siloxane units with radicals R or Y can be equal or different for each silicon atom. Each molecule can bear one or more groups independently.

The preferred structures of reactive polyorganosiloxanes for component B2) in the compositions of this invention are siloxanes of formula (Va) to (Vd).

The preferred structure composed with these units are selected from $$YR_2SiO(R_2SiO)_z(RYSiO)_pSiR_2Y \tag{V a}$$

$$YMe_2SiO(Me_2SiO)_z(MeYSiO)_pSiMe_2Y \tag{V b}$$

$$Me_3SiO(MeYSiO)_pSiMe_3 \tag{V c}$$

z=0 to 1000
p=0 to 100
z+p=b4=1 to 1000
and structures of the formula $$\{[YSiO_{3/2}][R^9O]_{n2}\}_{m2} \tag{V d}$$

$$\{[SiO_{4/2}][R^9O_{1/2}]_{n2}[R_2YSiO_{1/2}]_{0,01-10}[YSiO_{3/2}]_{0-50}[RYSiO_{2/2}]_{0-1000}\}_{m2} \tag{Ve}$$

wherein $R^9O_{1/2}$ is an alkoxy residue at the silicon
m2=1 to 2000
n2=0.001 to 2
a4=0.01-10
b4=0-1000
c4=0-50
Y=hydrogen or R
R as defined above, the preferred group R is methyl.

One preferred example of the class (Vd) and (Ve) are e.g. monomeric to polymeric compounds represented by the formula $[(Me_2HSiO)_4Q]_{m2}$.

The index z and p for the other type of preferred compounds with the formulas (Va) to (Vc) are in the range of 0-1000 defined as average Pn based the number average mol weight Mn measured by GPC versus a polystyrene standard.

The SiH-concentration is in the range of 0.2 to 17 mmol/g. In one of the preferred types of formula (Vb) wherein R=methyl and z>0 the SiH concentration has values of preferably 0.2 to 7 mmol SiH/g. If z=0 as in formula (Vc) for R=methyl the SiH concentration is preferably 7-17 mmol-SiH/g.

Other examples of preferred suitable structures for component B2) in the compositions of this invention include $HMe_2SiO(Me_2SiO)_zSiMe_2H$, $Me_3SiO-(MeHSiO)_p SiMe_3$, $HMe_2SiO(Me_2SiO)_{z1}(MePhSiO)_{z2}(MeHSiO)_pSiMe_2H$, $(MeHSiO)_p$, $(HMe_2 SiO)_4Si$ and $MeSi(OSiMe_2H)_3$. The component B2) can be used as a single component of one polyorganosiloxane polymer or mixture thereof. In a preferred alternative mixtures of formula (Vb) and (Vc) are used. If the increase of the cure rate is required, it is preferred to have some organopolysiloxanes B2) with $HMe_2SiO_{0.5}$—units to adjust the cure rate to higher rates.

Preferably component B2) contains an average of two or more silicon units with bonded hydrogen atoms such as, for example, 5, 10, 20, 40 and more.

The amount of component B2) is given by the stoichiometry of the reactive groups of A2) and B2). Using different molar ratios of Si-alkenyl to SiH one can achieve an appropriate release force, i.e the Si-alkenyl to SiH ratio is adjusted for at least a value that the unsaturated groups linked to silicon can react completely with SiH-groups. It is noteworthy to provide a certain excess of SiH for side reactions. Such a ratio of Si-alkenyl:SiH should be in the range 1:0.5 to 20, preferably in the range of 1:1 to 5, especially preferred 1:1 to 3.5.

If non silicon olefins are used, like alpha-olefin solvents, the amount of B2) is adjusted to sum of all alkenyl groups.

The polymers A3) can be crosslinked by one of the components A1), B1), B2) or by A3) itself or other another component B3) which can undergo photoinitiated or photoactivated reactions with the polyorganosiloxane A3) to achieve a cross-linked polymer surface with appropriate release forces properties.

Beside the named silicon containing polymers A) or B) above the component B3), can be selected from the group which consists of $C_3$ to $C_{1000}$ organic compounds of oligomeric polyhydroxy, polymercapto, polyamino, polyacrylate, polymethacrylate, acryloxyurethane compounds with aliphatic or aromatic or polyether chains as long each of the selected compound B3) has preferably more than 2 functional groups per molecule. These molecules must not necessarily be comprised of silicon containing compounds. There also a lot of other multifunctional monomeric, oligomeric or polymeric organic molecules which can fit in.

If the component B3) is selected from polyorganosiloxanes A3) or B2).

In one embodiment the component b3) is a subgroup of A3) containing siloxane building units whereby these groups are selected from the units $M=R_3SiO_{1/2}$, $M^*=R_2ZSiO_{1/2}$, $ID=R_2SiO_{2/2}$, $D=*RZSiO_{2/2}$, $T=RSiO_{3/2}$, $T^*=ZSiO_{3/2}$, $Q=SiO_{4/2}$, or $Z_fSi(OR)_{(4-f)}$ wherein f=2, 3 or 4 or having the general formula (VI)

This means the crosslinker B3) can be described by the ratios of the general formula (VI), $$[M_{a5}D_{b5}T_{c5}Q_{d5}]_{m3} \quad (VI)$$

wherein the siloxy units can be distributed blockwise or randomly in the polymer chain if B3) is a polymer. Within a polysiloxane chain each siloxane unit can be identical or different and m3=1-1000
a5=1-10
b5=0-1000
c5=0-50
d5=0-1 and these indices should represent the average polymerisation degree based on the average number mol weight.

The range for M-, D-,T- and Q-units present in the molecule can cover nearly all values representing fluids, flowable polymer, liquid and solid resins. It is preferred to use liquid siloxanes with a low mol weight up to 100,000, preferably up to 50,000 g/mol.

The siloxane units with radicals R or Z can be equal or different for each silicon atom. Each molecule can bear one or more groups Z and R independently.

The preferred structures of reactive polyorganosiloxanes for component B3) in the compositions of this invention are siloxanes of formula (VIa) to (VId).

$$ZR_2SiO(R_2SiO)_{z3}(RZSiO)_{p3}SiR_2Z \quad (VIa),$$

$$ZMe_2SiO(Me_2SiO)_{z3}(MeZSiO)_{p3}SiMe_2Z \quad (VIb),$$

$$Me_3SiO(MeZSiO)_{p3}SiMe_3 \quad (VIc),$$

$$\{[ZSiO_{3/2}][R^9O_{1/2}]_{n3}\}_{m3} \quad (VId),$$

$$\{[SiO_{4/2}][R^9O_{1/2}]_{n3}[R_2ZSiO_{1/2}]_{0.01-10}[ZSiO_{3/2}]_{0-50}[RZSiO_{2/2}]_{0-1000}\}_{m3} \quad (VIe)$$

wherein $R^9O_{1/2}$ is an alkoxy or hydroxy residue at the silicon preferably hydroxy, methoxy or ethoxy whereby the preferred indices are m3=1 to 100
n3=0.001 to 3
a5=0.01 to 10
b5=0 to 200
c5=0 to 50
d5=0 to 1

R as defined above, the preferred group R is methyl.

Z is $R^4$ or is hydroxy, a n-, iso-, tertiary-, cyclic $C_1$-$C_{30}$ organo group with hydroxyalkyl, aminoalkyl-, epoxy-alkyl, mercaptoalkyl, isocyanato-acryloxy substituted alkyl-, alkylaryl-, vinylethers, acryloxyurethane radicals.

The component B3) can be a corresponding multifunctional organic compound comprising residues selected from the group Z without silicon thereof.

The index z3 and p3 are defined as z3=z
p3 =p as defined under B2).

The preferred group R is methyl.

The concentration of reactive groups covers a broad range between 0.002 to 50 mol/g. The concentration depends extremely on the mol weight and the amount of functionality per molecule of component B3).

The ratio of crosslinker B3) to polymer A3) can be calculated by the ratio of reactive groups in B3) and A3) if e.g. the components A2), B2) and C2) are used as photoinitiated curable system. Then the ratio is suitably similar to a system like B2) and A2) with a ratio of 0.5 to 20:1. If A3) should be cured by curing mechanism different than a photo-induced hydrosilylation i.e. like by ionic or radical mechanism than A3) and B3) can be identical or different in the group Z and the purpose of the second component B3) is to provide different amounts of functionalities in order to achieve different coating properties.

It is then preferred to have an excess of reactive groups B3) compared to A3) with a ratio of 1 to 20:1, whereby the functionality of B3) is higher and the molweight is smaller than that of A3).

The preferred classes of B3) are crosslinkers of the type B2) i.e. hydrogensiloxanes, polymers A2) such as vinylsiloxanes or polymers A3) such as epoxy- or acryloxysiloxanes or siloxanes B3) wherein the component B3) preferably contains an average of three or more photoreactive groups, such as, for example, 5, 10, 20, 40 and more.

The amount of component B3) is adjusted with the aim to achieve an appropriate release force within the range of the definition in before, i.e the reaction of the starting product A3) and if present B3) are adjusted to achieve a complete turnover of reactive groups. Another way is to optimize the curing time, temperature level and to optimize the concentration of functional groups in A3) to ensure a cure result which is as complete as desired for getting the appropriate release properties, mechanical strength and flexibility of the coating film.

The inventive composition contains at least one component C) selected from the group of a catalyst C1), C2) and a sensitizer C3) or a radical initiator C3)

Polymeric composition systems including the base polymer A1) curable by a condensation reaction can be catalyzed by compounds of the type C1). The catalysts C1) are selected from the group of a variety of organometallic compounds preferably organo tin, titanium, zinc, calcium compounds but one can also use Lewis acids or Broensted acids or basis, preferred acids and basis are such types with low vapour pressure, $C_1$-$C_8$ carbonacids or alkylamines.

A preferred class of organometal compounds are salts like dialklytin oxides, reaction products of dialkyltinoxide with tetraalkoxsilanes, dibutyltindilaurate, stannous octoate, dibutyltin dioctoate, zinc octoate, tetraalkoxy titanates or alkoxy titanium chelates of $C_1$-$C_{10}$ carboxylic residues, etc. Based on the silanol chain-stopped gum A1), there should be e.g. from 0.3 wt.-% to 10 wt.-% of the tin catalyst (as metal). Below the level of 0.3%, sufficiently rapid cure at low temperatures is not achieved. Other examples of such catalysts are primary, secondary, tertiary amines, preferably with disassociation constants of at least $10^{-10}$, condensation products of an aliphatic aldehyde with a primary amine, carboxylic acid salts of metals like titanate esters, and alkali metal phenoxides. Specific examples of such catalysts are set forth in column 3, lines 19-54 of U.S. Pat. No. 3,527,659, the disclosure which is incorporated herein by reference for the benefit of those unfamiliar in this art. A particular useful curing catalyst for polymers A1) of this invention are quaternary ammonium salts such as benzyltrimethylammonium compounds like acetate, tetraalkylammonium acetate or other see U.S. Pat. No. 3,819, 745.

The catalyst for systems including base polymer A2) curable by a hydrosilylation reaction or radiation assisted addition reaction can be catalyzed by photoactivatable compounds of the type C2). The catalyst C2) is selected from the group of a variety of organo-metallic wherein the metal is selected from the group of Ni, Ag, Ir, Rh, Ru, Os, Pd and Pt compounds. The component C2) for the hydrosilylation reaction of the inventive composition is a catalyst compound which facilitates the reaction of the silicon-bonded hydrogen atoms of component B2) with the silicon-bonded olefinic hydrocarbon radicals of component A2) and can be any platinum group metal-containing catalyst component. The catalysts C2) belongs to the platinum group include herein complexes, metal colloids or salts of the afore mentioned metals. The catalyst can be present on a carrier such as silica gel or powdered charcoal, bearing platinum metal, or a compound or complex of a platinum metal. Preferably, component C2) is any platinum complex compound.

A typical platinum containing catalyst component in the polyorganosiloxane compositions of this invention is any form of chloroplatinic acid, such as, for example, the readily available alcoholic solution form of the hexahydrate, because of its easy dispersibility in organosiloxane systems. A particularly useful form of the platinum complexes are the $Pt^{(0)}$-complexes with aliphatically unsaturated organosilicon compound such as 1,3-divinyltetramethyldisiloxane, as disclosed by U.S. Pat. No. 3,419,593 incorporated herein by reference are especially preferred.

The amount of platinum-containing catalyst component that is used in the compositions of this invention is not narrowly limited as long as there is a sufficient amount to accelerate the hydrosilylation between A2) and B2) at the desired temperature in the required time B2) in the presence of all other ingredients of the inventive composition. The exact necessary amount of said catalyst component will depend upon the particular catalyst, the amount of other inhibiting compounds and the SiH to olefin ratio and is not easily predictable. However, for chloroplatinic acid said amount can be as low as possible due to cost reasons. Preferably one should add more than one part by weight of platinum for every one million parts by weight of the organosilicon components A2) and B2) to ensure curing in the presence of other undefined inhibiting traces. For the compositions of this invention, which are to be used by the coating method of this invention the amount of platinum containing catalyst component to be applied is preferably sufficient to provide from 1 to 1000 ppm preferably 5 to 500 ppm, especially preferred 20 to 100 ppm by weight platinum per weight of polyorganosiloxane components A2) plus B2). Preferably said amount is at least 10 ppm by weight per sum of A2) and B2) if a paper carrier is used as substrate for the siloxane release layer.

The third system including a photoactivatable and photocurable base polymer A3) and optionally a photoactivatable or photocurable crosslinker B3) needs the assistance of a catalyst to start the radiation induced curing reaction in most cases. This reaction can be catalyzed or initiated by compounds of the type C3). The catalysts C3) optionally required for polymers A3) are selected from the group of a variety of catalysts of the type of metal organic onium salts C3.1), photosensitizers of the type C3.2) or initiators of the type C3.3) which start or catalyse the photo reaction. The compound C3.1) is therefore selected from the group of onimum salt complexes or special Pt-complexes as disclosed in WO 95/25735, WO 95/25734, i.e. all photoactivatable Pt-catalysts like EP 122008, EP 1463074. or US 2003-0199603 enabling hydrosilylation by photoactivation between the components A2) and B2) are also included by reference.

The onium salt photocatalyst C3.1) used to affect the cure in the process of the present invention may be any of those previously described catalysts in the literature. According to U.S. Pat. No. 4,977,198, the onium salts are well known, particularly for use in catalyzing cure of epoxy functional materials.

Epoxy-functional silicones can be made UV-curable by combining with a catalytic amount of an onium salt photoinitiator. Suitable photoinitiators for epoxy-silicone compositions are the onium salts having the capability of dissolving or dispersing well in the epoxy functional silicone fluid.

These catalysts exhibit typical solubility characteristics of diaryliodonium salts, namely, being soluble in polar organic solvents such as chloroform and acetone but insoluble in non-polar organic solvents such as pentane, hexane and petroleum ether. Such solubility behaviour severely limits the utility of these salts for initiating the rapid photocuring of epoxy functional silicone paper release compositions see U.S. Pat. No. 5,539,013.

Most of the disclosed onium catalysts are described in U.S. Pat. No. 4,576,999 and references therein, the preferred UV photoinitiators for the curing process of epoxysilicones are the "onium" salts, of the general formulas $$R^{11}{}_2I^+MX_n^-$$

$$R^{11}{}_3S^+MX_n^-$$

$$R^{11}{}_3Se^+MX_n^-$$

$$R^{11}{}_4P^+MX_n^-$$

$$R^{11}{}_4N^+MX_n^-$$

where different radicals represented by $R^{11}$ can be the same or different organic radicals with C1 to C30 aliphatic hydrocarbons, including aromatic carbocyclic radicals from 2 to 20 carbon atoms which can be substituted.

The complex onium anion is selected from the group $MX_n$, wherein MX is a non-basic, non-nucleophilic anion, such as $BF_4^-$, $PF_6^-$, $AsF_6^-$, $SbF_6^-$, $SbCl_6^-$, $HSO_4^-$, $ClO_4^-$, and the like. The U.S. Pat. No. 4,421,904 is incorporated herein as reference.

Other onium catalysts are known in the art, like the borate types of EP 0703236 or U.S. Pat. No. 5,866,261 such as $B(C_6F_5)_4^-$.

The photoinitiators may be mono- or multi-substituted mono, bis or trisaryl salts. The complexed onium cation is selected from the elements of the group VII, VI and V.

As disclosed in U.S. Pat. No. 4,882,201, the radiation-initiated cure of epoxysilicones coated on a substrate can be achieved with UV lamps such as: mercury arc lamps (high, medium and low pressure), Xenon arc lamps, high intensity halogen tungsten arc lamps, microwave driven arc lamps and lasers. Additionally, ionizing radiation using, for example, $^{60}Co$ is also useful as a radiation source. In this latter instance, the ionizing radiation serves both to initiate cure an epoxy-silicone coating. Uncured polymer layers are submitted to radiation. The thus coated substrate was then exposed to two medium pressure mercury vapor ultraviolet lamps, each furnishing e.g. 200 watts/inch focused power. A clear, glossy, smear-free surface of a silicone release layer was obtained by curing in less than 1 second.

Bis-diaryl iodonium salts, such as bis(dodecyl phenyl)iodonium hexafluoroarsenate and bis(dodecyl phenyl) iodonium hexafluoroantimonate, and (4-octyloxyphenyl) (phenyl) iodinium hexafluoroantimonate are especially preferred within the MX types as catalyst see also U.S. Pat. No. 4,421,904. These salts are the most preferred in practicing light induced curing of epoxysiloxanes.

The photocatalyst can be solved e.g. in form of a 50 wt. % solution in 1,3-bis (glycidyloxypropyl)-tetramethyldisiloxane. In such systems sensitizers of the type C3.2) are used. In addition here like isopropyl-thioxanthone sensitizer can also be present at a concentration of 15 mole % of the iodonium salt U.S. Pat. No. 4,279,717.

The second group of catalysts are compounds of the group C3.2) selected from the group of free-radical photoinitiators, benzophenones and derivatives thereof, benzoin ethers, alpha-acyloxime esters, acetophenone and camphorquinone, derivatives, benzil ketals, ketone amine derivatives. Preferred examples of these photoinitiators include ethyl benzoin ether, isopropyl benzoin ether, dimethoxyphenyl acetophenone and diethoxy acetophenone.

UV-curable epoxy but especially acrylic-functional silicone compositions can be made by combining the above-described acrylic-functional silicones with a catalytic amount of a free-radical-type photoinitiator which will effectively initiate crosslinking of the acrylic groups contained in the composition.

The photo initiators C3.2) are present in an amount of 4 wt. % diethoxyacetophenone photoinitiator in the base polymer A3).

Brand names of such initiators are e.g. Darocure® 1173 (E. M. Chemicals) Irgacure 651 photoinitiator, a benzoin ether type free radical initiator available from Ciba-Geigy. The photoinitiators are generally used at a concentration of from about 0.1 wt. % to about 5% by weight of the total weight of the release coating composition A)+D).

The release coating composition of this invention provides coatings which possess the desired level of release immediately upon curing. Thus, the composition is suitable for the use in the integrated manufacture of adhesive-coated labels and tapes.

The third group of catalysts of the type C3), are selected from the group C3.3) out of thermo- or photo activatable radical initiating peroxy or azogroup containing compounds.

Preferred photoinitiators are disclosed by Edwards U.S. Pat. No. 3,211,795, Hatanaka, U.S. Pat. No. 4,451,634 and Eckberg U.S. Pat. No. 4,558,147, hereby incorporated by reference.

Briefly, Eckberg discloses certain perbenzoate esters having the general formula: $R^{12}$—O—O—CO—$C_6H_5$—$Z^1$ wherein $R^{12}$ is a monovalent alkyl or aryl group and $Z^1$ is hydrogen, alkyl, halogen, nitro, amino, or amido. The nature of the $Z^1$ substituent will affect the stability of the peroxy bond. Preferred perbenzoate esters include t-butylperbenzoate and its para-substituted derivatives, t-butyl-per-p-nitrobenzoate, t-butylper-p-methoxybenzoate, t-butylperoxy-p-methylbenzoate and t-butylperoxy-p-chlorobenzoate. In addition to t-butyl-perbenzoate and its derivatives as photoinitiators, Eckberg et al. disclose that the inclusion of certain photosensitizers enhances reactivity. The photosensitizers can be poly-aromatic compounds of the type C3.2)

Edwards, et al., teach in the U.S. Pat. No. 3,211,795 certain azo compounds as being superior to either peroxides or ultraviolet radiation. An example of such a preferred azo compound is azodiisobutyronitrile.

Other photoinitiators, whose suitability for use in a particular situation can easily be ascertained by the artisan, are described in U.S. Pat. No. 3,759,807, U.S. Pat. No. 3,968,305, U.S. Pat. No. 3,966,573, U.S. Pat. No. 4,113,592, U.S. Pat. No. 4,131,529, U.S. Pat. No. 4,130,600, and U.S. Pat. No. 4,348,462. All of these patents are incorporated by reference into this disclosure for their teachings related to photoinitiators.

The amount of photoinitiator employed is not critical as long as e.g. the addition of the photo activatable e.g. mercaptan to the unsaturated hydrocarbon is achieved. As with any catalyst, it is preferred to use the smallest effective amount possible. Generally, the amount of a photoinitiator is at least 0.5 part by weight and can be anywhere from about 0.5 to about 10 parts by weight based on 100 parts by weight of polyorganosiloxane A3).

The most important ingredient of the inventive composition is the usage of a pressure sensitive adhesive called PSA as component D). There are many disclosures like U.S. Pat. No. 5,576,110 how to make such Pressure Sensitive Adhesives (PSA), especially silicon containing Pressure Sensitive Adhesives.

The inventive step was to find that some of the known PSA with a preferred structure can replace known release modifier often called CRA (Controlled Release Agent) known in the art like the MQ resin types by more efficient compounds. Such CRA compounds according to state of the art must be used in bigger amounts, i.e they are less effective compared to the selected PSA of this invention. The difference to all those applications in which PSA's are used as adherent layer is that in this invention these pressure sensitive adhesives are used as incorporated part of a release layer. With other words in this invention PSA's are not placed as separate layer on any release surface, they are incorporated in the release matrix or layer, where they act as modifier to increase the release forces against any other adhesives the labels and the like after the incorporating matrix was cured. The disclosure of this invention shows that not all of the available PSA types offer the maximum efficacy of an appropriate release modifying agent in the individual release layer matrices.

Such pressure sensitive adhesive compositions are described in, for example in, "Adhesion and Bonding," Encyclopedia of Polymer Science and Engineering, Vol. 1, pp. 476-546, Interscience Publishers, Second Ed., 1985. Such polymeric compositions generally contain an adhesive polymer such as natural or reclaimed rubbers, styrene-butadiene rubber, styrene-butadiene or styrene-isoprene block copolymers, polyisobutylene, poly(vinylether) or poly(acrylic)ester as a major constituent. Other materials may be included in the pressure-sensitive adhesive composition such as resinous tackifiers including rosin esters, oil-soluble phenolics and polyterpenes, antioxidants, plasticizers such as mineral oil or liquid polyisobutylene, and fillers such as zinc oxide silica or hydrated alumina.

The term "Pressure Sensitive Adhesive" as used herein, refers to adhesives which, in dry form, are permanently tacky at room temperature, i.e. 25° C. and firmly adhere to surfaces upon mere contact, according to the Encyclopedia of Polymer Science and Engineering, Vol. 1, John Wiley & Sons, New York, (1985), p. 551.

PSA compounds of this invention are defined in addition by their melting behaviour and the miscibility with the main part of the release matrix or layer.

The PSA's of this invention are miscible or show a certain degree of miscibility with the incorporating release matrix A) and B). In this embodiment, the pressure sensitive adhesive has a equilibrium transition melting temperature, $T_m$, with or without migratory component(s) in the range of about 40° C. to about 25° C. (as described on p. 173-174 of Donatas Satas, Handbook of Pressure Sensitive Adhesive Technology, $2^{nd}$ Edition, Van Nostrand Rheinhold, New York (1989)).

The most important feature of the component D) is that it has a tacky surface when brought into contact with those peelable adhesive layers commonly used for labels without reacting irreversible with that other layers adhering to them.

It is preferred that the PSA is substantially completely miscible with the release composition e.g. polydimethylsiloxanes A) of this invention. This means the composition of the components A), B) and D) is clear and transparent after mixing. But it could be miscible or not with the compounds of adhesive layers which will be brought into contact later on as peelable layer. In addition the melting point according to the equilibrium transition temperature Tm should be smaller than 25° C. preferably smaller than 10° C. measured by Differential Scanning Caloriometry (DSC).

Suitable PSA's can not only be selected from the group of polyorganosiloxanes but also from other organic PSA polymers like the adhesives defined above preferably acrylics or urethanes as long as 2 of the requirements for PSA are fulfilled.

In the meaning of the present invention the pressure sensitive adhesive is an organic polymer with a defined solubility parameter difference to the release layer matrix and to the counterpart adhesive, as well as a preferred Tm range which shows at least a certain level of tackiness defined by the release force measuring method disclosed here. The Peel Adhesion measured according to the Finat test method FTM 1 should have a value of at least 500 cN/inch preferably more than 700 cN/inch. At least two of these conditions should be fulfilled versus each matrix layer which are in most case adhesive layers of labels and the like.

Generally, the pressure sensitive adhesives are compounds of an adhesive that retains pressure sensitive adhesive characteristics for the duration of the usable life of the layer, see U.S. Pat. No. 6,565,969.

The pure pressure sensitive adhesive layer used in the present invention typically retains pressure sensitive adhesive characteristics after storage at room temperature (25° C.) for at least 3 months, preferably at least 12 months. Preferably the adhesive properties are available for at least about 20 days at 40° C. The PSA does not undergo irreversible measurable chemical bonds to the adhering counterpart layer.

An example of a pressure sensitive adhesive that would not be considered tolerant of migratory components from any contacting layer is one in which reactive components can migrate into the pressure sensitive adhesive layer and can undergo a curing reaction prior to bonding. Such a pressure sensitive adhesive layer offers no longer effectively function as a pressure sensitive adhesive even though the degree of chemical curing is low.

One class of preferred pressure sensitive adhesives are substantially incompatible with the bondable layer or with the release matrix when it is used and tested at 25° C. upon any of such surfaces. The phrase "substantially incompatible" as used herein refers to an adhesive layer and a pressure sensitive adhesive compound whose components do not intermix when deposits on a surface of that adhesive.

The pressure sensitive adhesive layer has either a substantial resistance to, or lack of any substantial interaction with, any migratory components of the other adhesive layer such that its pressure sensitive adhesive characteristics are retained. In other words, any migratory components of the bondable layer do not substantially affect the pressure sensitive characteristics of the pressure sensitive adhesive.

One way of achieving "substantial incompatibility" between a pressure sensitive adhesive layer,—if it would be applied as pure layer—, and any other bondable or releasing layer is to employ a pressure sensitive adhesive layer having a solubility parameter according to that of Hildebrand which differs substantially from the solubility parameter of any migratory component having contact to the PSA. The term "differs substantially" as used generally refers to a solubility parameter difference of at least about 1 $(cal/cm^3)^{0.5}$, typically, at least 1.1 $(cal/cm^3)^{0.5}$, preferably at least 1.2 $(cal/cm^3)^{0.5}$.

Solubility parameters are described in E. A. Grulke in Polymer Handbook: $3^{rd}$ Edition, J. Brandrup, E. H. Immergut, and E. A. Grulke, Editors, John Wiley and Sons, 1999, Section VII. Solubility parameters can be determined experimentally or may be calculated as described in Fedors, Polym. Eng. and Sci., 14 (1974), 147 and WO 98/21287.

Another class of pressure sensitive adhesives are characterized by the range of the melting point expressed as equilibrium melting transition temperature $T_m$ sometimes mistaken with or identical with $T_g$, if the solubility parameter difference as described above is not big enough. One can tolerate the presence of some amount of migratory components from other layers without losing its ability to function as a pressure sensitive adhesive layer.

A suitable way to determine the Tm is to measure the maximum in the tan delta peak of a dynamic mechanical scan made by changing the sample temperature while holding the measurement frequency fixed at approximately 1 Hz.

For other details of the measuring for example, using the Fox equation, see L. H. Sperling, Introduction to Physical Polymer Science, 2$^{nd}$ Edition, John Wiley & Sons, New York, p. 357 (1992) and T. G. Fox, Bull. Am. Phys. Soc., 1, 123 (1956) are incorporated by reference.

The selection of the pressure-sensitive adhesive which is to be used in any composites of the invention is not critical in a broad range of concentrations to those skilled in the art who are familiar with many suitable pressure-sensitive adhesives for particular applications. The selections takes into account the solubility of the release matrix and that of the peelable adhesive on the label layer.

Among the release modifying additives, known up to now as CRA, many resin like structures are disclosed achieving higher release forces. But especially the most commonly used so called MQ silicon resins are solids. Their tackiness as pure solid compound or dispersed in the release matrix is not very efficient. In addition these resins have to be solved in organic solvents with distinct solubility parameters in before of their usage as modifying component in a paper release composition. The solvent must evaporated before use, because the solved CRA's are applied in a range of 1 to 20 wt. % of the release composition or must bear reactive groups such as alpha-olefins, to become incorporated in the cured release layer. The effectiveness of such resins used as CRA according to state of the art containing the siloxane units M and Q and casewise small amounts of D- or T-units is very low. The addition of minor amounts of T- or D-units by CR-additives as disclosed in EP 400 614 A1 does not change the performance of these release modifiers significantly.

It was unexpected how to get a much more efficient release modifying additive when synthesizing and using reaction products of MQ- and D-units containing polymeric precursors with higher amounts of D- or T-units than disclosed in EP 400614 to achieve flowable or gumlike, high viscous (i.e. 1-1000 kPa·s at 25° C. D=1 s$^{-1}$) reaction products especially blockpolymers under the condition of a condensation reaction or by other reactions enabling the copolymerization of the resinous MQ- and gumlike D-units containing component.

In a preferred embodiment the PSA is organsilicone resin comprising D and Q units with a molar ratio of D:Q of >1.

The polymer used as component D) in the curable release composition is selected from polyorganosiloxanes comprising siloxane units of
at least one M unit
at least one Q unit, and
at least one D unit.

Preferably the component D) is a reaction product of at least 2 precursor polymers and in addition in a preferred embodiment the molar ratio D:Q of that reaction product is >1. The preferably used PSA's are reaction products of MQ-resins which are solid at 25° C. together with a flowable polyorganosiloxane precursor, preferably polyorganosiloxandiols substantially composed of D-units. The preferred structures (IX) show distinct ratios between the MQ-resin block and the D-units of the gum and are defined by a reaction of the prepolymers, the chain length of the flowable polyorganosiloxanes representing the D-units and the structure of the polymer after the reaction provided by the precursors. With respect to a fundamental standpoint it is clear that the reaction conditions and the suitable starting products can not achieve in yielding exclusively pure blockpolymers of the type [H][V] as shown in formula (IX). Probably there are many other side reactions between the precursors of the units [H] and [H] or [V] and [V] of the formulas (VIII) which end up at least in a changed mol weight distribution. Therefore at least more than 30 mol. % of the precursor components of D) should have a different mol weight than before. It is preferred to have an increase in mol weight of the starting materials [H] and/or [V]. As a result of the polymerisation or condensation reaction there is at least a side product selected from the group of water, alcohol, carboxylic acid or products including the reaction between R$^9$ groups and H atoms.

The preferred PSA types are polydiorganosiloxanes blockpolymers comprising siloxane units from the groups from M=R$^8$R$_2$SiO$_{1/2}$, D=R$^8$RSiO$_{2/2}$, T=R$^8$SiO$_{3/2}$ and Q=SiO$_{4/2}$ can be arranged in randomly or blockwise in different structures and sequences in the molecule wherein
R$^8$ is selected from R, R$^1$, R$^2$, R$^4$, R$^5$ such as hydroxy, C$_1$-C$_{30}$ alkyl, alkenyl, alkoxy, aryloxy, carboxy, oximo, alkenyloxy, amino, amido, such as vinyl, phenyl, styryl, 3-chloropropyl, chloromethyl, 4-epoxycyclo-hexyl-ethyl, glycidyl-oxypropyl, acryloxypropyl or mercaptopropyl or R$^2$Me$_2$SiO$_{0.5}$=M*, R$^4$Me$_2$SiO$_{0.5}$=M*, it can be equal or different in each siloxane unit.
R is defined as above.
Preferred groups for R are methyl, phenyl, 3,3,3-trifluoropropyl.
Preferred groups for R$^8$ are hydroxy, methoxy, ethoxy, acteoxy, vinyl and 4-epoxycyclohexylethyl, glycidyloxypropyl and acryloxypropyl radicals.

One of the preferred blockpolymer structure which is present in the reaction products of component D) can be expressed by the general formula (IX) which is supported by sequence of steps in the manufacturing process and by $^{29}$Si—NMR. The following formula should not limit the scope of reactions products to specific condensation products, because this invention will not exclude other types of reaction products which could be present here as long as the ratio of the starting products and the reaction conditions are the same as described below.

The component D) of the compositions of this invention is made from a siloxane resin, a silicon polymer and optionally in an organic solvent. wherein the component D) is selected from a polyorganosiloxane which is a reaction product between a resinous prepolymer comprising at least M- and at least Q-units and a gumlike prepolymer comprising at least D-units.

Wherein the units [H] and [V] are represented by the ratio of formula (IX)

$$[(H)_n]_y[(V)_n]_x \tag{IX}$$

H=MQ-resinous group
V=polyorganosiloxane group
n=1-100
y:x a molar relation wherein the molar ratio Q:D is =1:0.3 to 4 preferably 1:>1

The formula shall embrace also all the other reactions products (H)$_n$ or (V)$_n$ which are present like [H][H] (VIIIa) or [V][V] (VIIIb) as long as the overall molar ratio Q:D or transformed in y:x is fulfilled in the component D). The molar ratio y:x is in most cases the same or nearly the same as the molar ratio Q:D.

The prepolymer component of the unit [H] are MQ-siloxane resins and are known in the art. Silicone MQ resins comprise principally monofunctional $R^8{}_3SiO_{0.5}$ units and tetrafunctional $SiO_2$ units. These MQ resins can optionally contain additional D- and/or T-units in minor concentrations as defined below in formula (VIII)

$$[M_{a6}D_{b6}T_{c6}Q_{d6}]_{m4} \qquad (VIII)$$

m4=1 to 3000 preferably 5 to 150
a6=0.01 to 10 preferably 0.3 to 4 especially preferred 0.6 to 1.1
b6=0 to 1 preferably=0
c6=0 to 2 preferably=0
d6=1

This resin precursor comprises also condensable groups $R^8$ attached to the silicon preferably hydroxy or alkoxy. In addition there can optionally be present small amounts of so called crosslinkers represented by D-, T- or Q-siloxy units wherein at least one of the residues $R^8$ attached to the silicon atoms are selected from alkoxy or hydroxy groups.

Such crosslinkers with M, D, T, Q-units, if present, are used up to 10 wt. % to achieve a tighter network in the PSA molecule between the other precursors.

The prepolymeric resins [H] generally referred to as MQ resins are preferably soluble in aromatic solvents and containing M units, represented by the formula $R^8{}_3SiO_{1/2}$, and Q units, represented by the formula $SiO_{4/2}$. It is recognized that while MO resins are primarily made from M and Q units, there can be up to 7 mol percent D-units represented by $R^8{}_2SiO$ and up to 14 mol. % T-units, and T-units represented by the formula $R^8SiO_{3/2}$ in the prepolymer of [H]. In this embodiment the precursor resin [H] can also be a molecule containing MDTQ units. The radical $R^8$ then are preferably selected from the group defined above and R. The preferred radicals $R^8$ are methyl, methoxy, ethoxy or hydroxy.

The ratio y:x of the formula [H]:[V] of formula (IX) is defined without the D-units of the precursor resins [H], the T-units of the resins [H] are treated and calculated as Q-units of the precursor [H].

It is preferred to use MQ resins in the precursor [H] without D- und T-units.

It is further on preferred to use MQ resins with saturated alkyl or hydroxy residues $R^8$ attached to silicon to get the maximum increase of the release force using the reaction products later on. This is different to the known CRA resins where some groups of $R^8$ are preferably vinyl groups. The introduction of reactive groups $R^8$, e.g. vinyl groups, is a tool to increase the cure rate between the composition A) to D) if one accept on the other side the weakening of the tackiness. If there are too many reactive groups $R^8$ of that type which can undergo reactions with the reactive groups of release polymer A) or crosslinker B) upon curing of the release matrix and become part of the network.

Tackiness of the release layer can be decreased as a result in such a case.

Other types of reactive unsaturated groups $R^8$ can also be introduced into the MQ-resin [H] or the polymer [V] or the reaction product [H][V] after an additional reaction by sylilation of e.g. SiOH-groups with additional reactive M groups such as $ViMe_2SiO_{0.5}$ made out of $ViMe_2SiOH$ as precursor or comparable precursors like disilazanes.

The MQ resin [H] is a prepolymer bearing different types of reactive groups directly attached to silicon such as preferably silanol or some remaining alkoxy groups. These resins have a M:Q ratio ranging from 0.3 to 4:1 preferably 0.6 to 1.1:1. The mol weight is roughly characterized in a first attempt by the viscosity of a standardized solution of the resin. The mol weight distribution of the precursor [H] is broad compared to the other employed polymers like that of the gumlike precursor M or most of the polymers of type A).

The MQ-resin solution measured at 60 wt. % in toluene for $R^8$=methyl should have a viscosity from 2 to 20 cSt, preferably those solutions should have a viscosity between 4 to 15 cSt especially preferred 5 to 13 cSt at 25° C. and a shear rate of $D=1s^{-1}$.

The MQ resin is preferably a silanol-containing prepolymer, but other hydrolysable groups $R^8$ can be present in place of hydroxy. The MQ resin structures [H] having an M:Q ratio from about 0.6 to 1.1:1 comprise SiOH-groups of generally from about 0.2 wt. % to about 5 wt. %, preferably from about 1 wt. % to about 3 wt. %, and most preferably from about 1.5 wt. % to about 2.5 wt. % by weight of the total weight of the MQ resin prepolymer [H].

Methods for making the siloxane resin [H] are disclosed by Daudt et al. Such resins can be provided in accordance with the procedures described in U.S. Pat. No. 2,676,182 and U.S. Pat. No. 2,736,721 both of which are hereby incorporated by reference. These MQ resins can generally be provided by combining water and sodium silicate which then is further combined with an aqueous acid such as HCl. Daudt discloses a method in which a silica hydrosol is reacted under acidic conditions with a source of triorganosiloxy units such as hexaorganodisiloxane, e.g. hexamethyldisiloxane, or hydrolyzable triorganosilanes, e.g. trimethyichlorosilane or mixtures thereof, and recovering a benzene soluble resin copolymer having M and Q units. After vigorous stirring, alcohol is added and after additional stirring the mixture is combined with trimethylchlorosilane and refluxed for several hours whereupon an organic solvent is then added. The resin solution can then be separated from the aqueous layer and stripped to reduce acidity and provide the desired silicone solids level. The additional crosslinkers if applied can be represented by the formula shown for B1).

In a preferred embodiment, such crosslinkers for making the inventive PSA compounds comprises one or more units T and/or Q-units represented by formula (IV a) or (IV b-IV d) comprising silanes or siloxanes with D and T siloxy units wherein each $R^8$ is independently hydroxy, alkoxy, preferably $(C_1-C_6)$-alkoxy, or a monovalent $(C_1-C_{14})$-hydrocarbon radical, provided that at least two $R^8$ per molecule are present to achieve an additional crosslinking effect within the manufacturing process for PSA's.

Such crosslinkers can also be poly-(alkoxysiloxane-alkoxytitanate) copolymers containing structural units according to formula (VIII c):

$$R^8{}_eTiO_{(4-e)/2} \qquad (VIII\ c)$$

wherein each $R^8$ is defined as above and 'e' is an integer from 0 to 2 as reaction product of silanoles, alkoxysilanes, alkoxysiloxanes, water and alkoxytitanates.

In a preferred embodiment, the crosslinker is dimethyldiethoxysilane, methyltrimethoxysilane, methyltriethoxysilane, a poly(diethoxysiloxane) or a poly-(diethoxysiloxane-diethoxytitanoate) copolymer.

The V=Polyorganosiloxane as Precursor for Component D)

Generally the prepolymer [V] is polyorganosiloxane selected from the polymers of the type defined preferably under A1, A2) or A3). The preferred polyorganosiloxane gum for the precursor of the unit [V] is a prepolymer bearing reactive groups $R^8$, especially preferred are silanol group containing prepolymers which can undergo condensation reaction with other reactive groups especially those of the other prepolymer the resin [H] in the presence of a catalyst for making component D) The average polymerization degree $P_n$ for the prepolymer [V] is in the range of 2 to 25,000 measured by the number average weight Mn, the preferred range of $P_n$ is 500 to 15000, the more preferred range is 500 to 3000 versus polystyrene as standard. The viscosity of such polymers are in the range of 10 to 200,000,000 mPa·s at 25° C. preferably in a range of 10000 to 5000000 more preferably in the range of 100000 to 2000000 at 25° C. at a shear rate of $D=1\ s^{-1}$. The inventors found out that too high polymerisation degrees or viscosities respectively of the precursor V cause a functionality of endgroups which is too low to generate efficient MDQ structures, with the effect that in some cases the increase of the release forces becomes smaller.

The prepolymer of the unit [V] is a silicone gum comprising preferably one or more silanol-terminated siloxane units and the siloxane units of the general formula (VIIId)

$$[M_{a7}D_{b7}T_{c7}Q_{d7}]_{m4} \qquad (\text{VIIId})$$

This means the prepolymer of the unit M can be described as the polymers A1) or A2) wherein the siloxy units can be distributed blockwise or randomly in the polymer chain. Within a polysiloxane chain each siloxane unit can be identical wherein the polymerisation degree is mainly influenced by the M:D molar ratio. The amount of T- and Q units if present is below 3 mol %.

It is preferred to use linear polymers composed mainly of M- and D-units.

The ratio D:Q (or y:x) of compound (IX) related to the ratio [V]:[H] is defined without counting the Q- and T-units of the precursor [V].

Beside other useful and suitable well known PSA's the preferred component D) is a siloxane characterized by the selected prepolymers as starting product and the condition of bringing them into reaction with each other.

Regardless to the structure and the distribution of the monomeric units, i.e. blockwise or randomly, in the precursors [H] and [V] the reaction product comprises blocks of the precursors, like [H][H], [V][V] or [H][V] and mixtures of the precursors.

The component D) of the present invention can be prepared by heating the prepolymers [H] and [V] at a temperature between 20-250° C., preferably 100 to 180° C., especially preferred 130-160° C. to reflux e.g, and cooking for about 0.5-10 hours, preferred 2 to 3 hours a mixture of the resin, silicone polymer gum V and an organic solvent in the presence of a catalyst. Catalysts can be all basic or add inorganic or organic compounds as long as they achieve at least condensation reactions between SiOH— or SiOH— and SiOR— groups, such as alkali hydroxides, siliconates, amines, tetraorganoammonium hydroxides, all types of phosphonitriles, metal carboxylates, such as dibutyltindicarboxylates, sulfonic acids, alkyl or perfluoralkyl acids. Suitable basic catalysts for preparing the PSA component D) include, for example, alkali metal hydroxides, e.g., sodium hydroxide, potassium hydroxide and the like, an aminofunctional silane such as those disclosed in U.S. Pat. No. 4,906,695 by Blizzard, which is hereby incorporated by reference. Suitable amino-functional silanes include, for example, N-gamma-aminopropyltriethoxy-silane, N-beta-aminoethyl-gamma-aminoisobutyltrimethoxysilane, and N-beta-aminoethyl-gamma-aminopropyltrimethoxysilane.

The preferred catalyst is sodium hydroxide, preferably in the form of an aqueous solution. It is preferred to use alkaline hydroxides such as sodium or potassium hydroxide in amounts of 0.0001 to 1 wt. % related to all components of compound D).

Especially these catalysts are used in the range of about 5 to about 40 ppm based on the combined weight of the resin [H] and polymer [V].

The leaving products under condensation, preferably water formed during the condensation reaction is then removed together with some amounts of solvents if present. The resulting mixture is cooled to 25° C., its solids content is adjusted by another organic solvent, and the catalyst is thermally destroyed (ammonium-hydroxides>130° C.) or neutralized with an equivalent amount of an inorganic such as $H_3PO_4$, HCl, $H_2SO_4$, or organic acids such as acetic acid, acetyl chloride, and the like respectively basis such as amines, oxides, alkali hydroxides.

The preferred siloxane component D) is a polymeric reaction product consisting of the units [H] [V] manufactured by a condensation or other polymerization reactions in bulk or in a solution of a mixture containing polyorgano-siloxane gum [V] and a MQ resin [H] and optionally a solvent. The preferred curable siloxane composition contains this reaction product as component D) which is selected from a precursor polyorganosiloxane gum [V] and a MQ resin [H] whereby the loss of typical leaving groups indicating the resulting condensation. In most cases it is preferred to control the extent of the reaction by its leaving products during condensation which are composed of leaving groups like $R^9OH$, especially preferred $H_2O$ in amounts of more than 0.01 wt. % of the starting products of component D) whereby $R^8=OR^9$. In one preferred embodiment the reaction products between the prepolymers yield measurable amounts, i.e. more than 10 wt. % of polyorganosiloxane blockcopolymers of the units [H][V]. The performance of the PSA is characterized in that not all the groups $R^8$, e.g. hydroxy groups, disappear within the reaction time for making, the compound D).

The applicable mixing ratio of the precursors and the partially available block-polymer structure of formula (IX) can be expressed by a preferred embodiment of (IXa) of the general formula (IX)

$$[M_{0,3-4}Q(O_{1/2}R^9)_u]_y[V]_x \qquad (\text{IX a})$$

wherein each unit [ ] represents polymeric structures y=1 to 200 preferred 1 to 10 x=1 to 200 preferred 1 to 10

[V]=preferably $M^*_2D_{500-15000}$ y:x is a molar relation wherein the molar ratio Q:D=1:0.3 to 4 preferably 1:>1 u=0.001 to 3 preferred 0.01 to 0.5

The component D) is therefore defined by the molar ratio of the siloxane units wherein D to Q or is preferably >1 or an related transformed ratio of x:y achieving this ratio and $R^9$ is R and is preferably H, methyl or ethyl.

The curable siloxane composition comprising A) to F) contains a component D) which is preferably selected from polyorganosiloxanes comprising non-reactive radicals $R^8$ which are non reactive in terms of the reactive groups occurring in each embodiment of the components A) and B), i.e A1) and B1), A2) and B2) or A3) and B3) within its curing reaction: i.e it is preferred to have components D) free of reactive groups of category 1. One preferred composition of the polymer (IX) after the reaction of the components [H] and [V] is therefore a polymethyl-siloxane which comprises neither minor amounts of any unsaturated organo nor hydrogen groups attached to silicon as reactive groups, i.e. reactive groups of the category 1, if used in a release matrix of A2), B2) and C2).

Other groups $R^8$ different to those reactive groups of category 1 in each of components A) and B) are named reactive groups of the category 2.

If the release matrix is composed of A1), B1) and C1) there should be preferably no reactive Si-alkoxy or SiOH-groups of category 1 in component D) which can react easily with SiOH— or Si-alkoxy groups of component A1) or B1) immediately within the curing step. There are of course remaining detectable, sterically hindered, 'hidden' SiOH— or Si-alkoxy groups of the category 1 in the component D) which mainly remains unreacted and become therefore groups of the category 2 in such a case. These reactive groups effective as category 2 selected from $R^8$ containing $R^9$ residues are remaining hidden groups introduced by the MQ-precursor which in majority do not react immediately with the components A) or B), especially A1), B1) or B2), within the curing reaction for the release matrix.

It is to be understood that the expression non reactive polyorganosiloxane D) comprises reactive groups of the category 2 in the component D) wherein these groups are mainly unreactive to category 1 and should not exceed 50 mol. % preferably 20 mol % of the reactive groups of the category 1 in the components A) and B).

The type of the reacting groups of each of the polymer A1) to A3) and crosslinkers B1) to B3) defines what is to be regarded as reactive group of category 1 or 2, because they provide the main source for reactive groups whereas the concentration in the component D) is smaller.

The remaining SiOH content of component D) is mainly defined by the SiOH content of the MQ resin [H] used as starting product, if the precursor component M has a polymerization degrees of more than 100. The remaining SiOH concentration after reaction between [H] [V] is smaller than before but was not measured up to now. Evidence for a measurable amount of these groups is given by a silylation reaction with hexaorganodisilazane that has a detectable effect upon the release performance of component D) in the release layer of A) to F).

One person skilled in the art can recognize that many possible mechanisms are involved in the adhesive compositions of related derivatives in the present invention. Without being limited to one specific theory, it is believed that the silanol functionality respectively other reactive condensable groups in the resin [H] plays a strong role as well in the formation of a condensed blockcopolymer as well as its role for getting a modified release character of the surface of the crosslinked release matrix.

The reactive groups $R^8$ of the category 2 can be detected by several methods e.g. NMR spectroscopy or by chemical modification of the SiOH groups via silylation wherein the SiOH groups can be changed to —$SiR^2O$—$SiMe_2Vi$ groups by e.g. 1,3-divinyltetramethyl-disilazane. Such modification are useful to adjust in addition the optimum between tackiness and the cure rate if desired.

The amount of prepolymer [H], the MQ resin, present in the component D) is from about 45 to about 75 weight percent, preferably from about 50 weight percent to about 65 weight percent of the total silicone weight of the component D) the [H][V]-polymer.

The MQ resin is commercially available, it is solved in aromatic solvent such as xylene or toluene, generally as a solution of 40 to 60 wt.-%. The solved MQ resin is physically mixed with a silicone gum [V] together with optionally a further organic solvent to enable the reaction forming the silicone adhesive component D) composed of [H][V] units. The silicone prepolymer gum [V] of the present invention is generally referred as a high molecular weight gum. The term "gum" refers to a high viscous material having a viscosity from about 10,000 mPa·s to about 200,000,000 mPa·s at 25° C. at a shear rate of D=1 $s^{-1}$, measured by a cone plate viscosimeter such as a Rheometrics rheometer.

The silicone gum as precursor of the unit M of the present invention is well-known to the art and is preferably one or more polydiorganosiloxane(s). The silicone polymer gum is preferably terminated with reactive groups of the category 1 which can undergo condensation reactions with other reactive groups attached to silicon selected from radicals defined by $R^8$ incorporated in the precursor [H]. Preferably the prepolymer [V] is a silanol-endstopped polydimethylsiloxane.

The condensed polydiorganosiloxane copolymer or block copolymer (IX) used as component D) in the present invention can be prepared by any of the methods known in the art. For example, the polydiorganosiloxanes of component D) of the type [H][V] can be prepared according to the method set forth in U.S. Pat. No. 2,814,601, which is herein incorporated by reference. The organic solvent suitably used in the preparation of the silicone adhesive composition can be any of the solvents conventionally used with organosilanes and having a boiling point below approximately 250° C., such as aromatic hydrocarbons, e.g., benzene, toluene, and xylene, aliphatic hydrocarbons, e.g., hexane, heptane, and cyclohexane, and halogenated hydrocarbon solvents, e.g., trichloroethane and chloroform.

The silicone PSA component D) is typically prepared in solvents such as toluene and xylene, although other hydrocarbon solvents can be used.

The composition of this invention can further comprise a rare earth metal salt of a fatty acid, such 2-ethylhexoat. Examples of rare earth metals suitable for forming the salt include cerium, lanthanum, praseodymium, and the like. The preferred rare earth metal is cerium.

The fatty acid preferably contains about 6 to about 18 carbon atoms, most preferably about 8 carbon atoms. Thus, the preferred rare earth metal salt for use in the present invention is cerium octoate or 2-ethylhexanoate.

Generally, rare earth metal salt can be used in the composition of this invention in an amount sufficient to provide the composition with an amount of rare earth metal within the range of from about 10 to about 500 parts per weight per million, based on the total weight of component D). The benefit of having rare earth metal in the adhesive composition is disclosed in the U.S. Pat. No. 5,612,400. These rare earth metal carboxylate salts have been found to be effective as stabilizers against heat and oxygen induced ageing processes.

Typically, the rare earth metal salt is used in the composition of this invention inform of a 30% solution, 6% of which is composed of the active rare earth metal. Examples are cerium octoate in low boiling aliphatic hydrocarbons.

The rare earth metal salt is added to the silicone adhesive mixture and solvent slowly in increments with agitation to get proper dispersion. Because rare earth metal salt is a base scavenger, it is necessary that the mixture will be neutral or slightly acid before the rare earth metal salt is added In order to get an useful release composition with modified release properties the the components A) to E) of this invention are mixed in any manner such as in bulk or in organic solvent. The MQ resin is a solid and is conveniently prepared and handled in an organic solvent. The preparation of the composition of this invention preferably uses an organic solvent, especially preferred solvents comprising reactive groups of the category 1 with respect to A2) or B2), such as e.g. alpha-olefines, for mixing the MQ resin and siloxane gum. The mixing of the components can be accomplished by any of the techniques known in the art, such as milling, blending, stirring, and the like, either in batch or in continuous process with stirrers, nozzles, dissolvers, kneader, mills or rolls.

A composition of this invention can be prepared, with or without the aid of a solvent, by simply mixing the MQ resin [H], silicone gum [V], and catalyst together in the stated proportion. The order of mixing of the components is not critical.

The function of a specific solvent can also be carried by a silicone fluid up to 2000 mPa·s, which is compatible with the silicone adhesive composition A) to E). They are selected from group of polymers defined under A) to B).

The preferred fluids are selected from polydiorganosiloxanes, especially polydimethylsiloxanes trimethylsilyl terminated.

The component D) of the invention must not necessarily be mixed into the polymer A) and B) by using a solvent. If appropriate mixing machines like rolls or kneaders are available one can omit the solvent. The component D) can then be dispersed at room temperature such as 10 to 40° C.

The selected PSA types used in this invention as release modifier are not limited to silicon containing Pressure Sensitive Adhesives generated by the afore mentioned reactions as long as the composition D) can provide that range of properties such as tackiness, solubility and melting points defined for suitable PSA in the selected release layer respectively adhesive layer.

Auxiliary Additives

The siloxane composition according to the invention may comprise further ingredients E) and F).

The additives falling under definition of component E) comprising all other types of compounds for stabilizing or coloring the polymers or adjusting the cure rate like for example inhibitors, antioxidants, pigments, stabilizers, water, fillers, espec. spherical silsesquioxanes for getting additional antiblocking properties of release layers, anti-mist additives as disclosed in U.S. Pat. No. 6,586,535 or US 2003-0134043, anchorage additives, slipping agents as disclosed in EP 819735 A1 and the like and further auxiliary components. These ingredients may be contained in the siloxane composition in a total amount of up to 20 wt. %.

Especially for the inventive compositions curable by hydrosilylation comprising A2), B2) and C2) it can be very helpful to adjust the cure rate by an appropriate amount of an inhibitor. If the ingredient E) is an inhibitor compound for said platinum containing catalyst C2) sufficient to retard the platinum catalyzed reaction at room temperature in order to enable mixing and the application on a carrier i.e. inhibition or retardation of some hours or days but achieving a sufficient cure rate, i.e completing the curing within seconds or minutes at elevated temperature especially above 70° C.

The inhibitor of component E) in the compositions of this invention is any material that is known to be, or can be, used as an inhibitor for the catalytic activity of platinum group metal-containing catalysts. By the term "inhibitor" it is meant herein a material that retards the curing at room temperature of a curable mixture of the components A2), B2), and C2), when incorporated therein in small amounts, such as less than 10 percent by weight of the composition, without preventing the elevated temperature curing of the mixture. Of course, it is known that materials, such as hydrocarbons, especially with unsaturated groups when used in high amounts like solvents, have an inhibiting effect such as up from 35 wt. %. These materials are nevertheless not considered as typical inhibitors for the purposes of this invention.

Inhibitors for the platinum group metal catalysts are well known in the organosilicon art. Examples of various classes of such metal catalyst inhibitors include unsaturated organic compounds such as ethylenically or aromatically unsaturated amides, U.S. Pat. No. 4,337,332; acetylenic compounds, U.S. Pat. No. 3,445,420 and U.S. Pat. No. 4,347,346; ethylenically unsaturated isocyanates, U.S. Pat. No. 3,882,083; olefinic siloxanes, U.S. Pat. No. 3,989,667; unsaturated hydrocarbon diesters, U.S. Pat. No. 4,256,870, U.S. Pat. No. 4,476,166 and U.S. Pat. No. 4,562,096, and conjugated enzymes. U.S. Pat. No. 4,465,818 and U.S. Pat. No. 4,472,563; other organic compounds such as hydroperoxides, U.S. Pat. No. 4,061,609; ketones, U.S. Pat. No. 3,418,731; sulfoxides, amines, phosphines, phosphites, nitriles, U.S. Pat. No. 3,344,111; diazindines, U.S. Pat. No. 4,043,977; and various salts, such as U.S. Pat. No. 3,461,185. It is believed that the compositions of this invention can comprise an inhibitor from any of these classes of inhibitors. Examples thereof include the acetylenic alcohols of U.S. Pat. No. 3,445,420, such as ethynylcyclohexanol and methylbutynol; the unsaturated carboxylic esters of U.S. Pat. No. 4,256,870, such as diallyl maleate and dimethyl maleate; and the maleates and fumarates of U.S. Pat. No. 4,562,096 and U.S. Pat. No. 4,774,111, such as diethyl fumarate, diallyl fumarate and bis-(methoxyisopropyl)maleate. The half esters and amides of U.S. Pat. No. 4,533,575; and the inhibitor mixtures of U.S. Pat. No. 4,476,166 would also be expected to behave similarly.

The above-mentioned patents relating to inhibitors for platinum group metal-containing catalysts are incorporated herein by reference to teach how to prepare compounds, which are suitable for the use as inhibitor component E) in our compositions.

Preferred inhibitors for the compositions of this invention are the maleates and fumarates. The maleates and fumarates have the formula $R^{10}(OW)_hO_2CCH=CHCO_2(WO)_hR^{10}$ wherein $R^{10}$ denotes a monovalent hydrocarbon radical having from $C_1$ to $C_{10}$ atoms and each unit W denotes, independently, an divalent alkylene radical having from 2 to 4 carbon atoms. $R^{10}$ can be, for example, an $C_1$-$C_{10}$ alkyl radical such as methyl, ethyl, propyl, isopropyl, butyl, pentyl or hexyl, an aryl radical such as phenyl or benzyl, an alkenyl radical such as vinyl or allyl, alkynyl radicals, or a cyclohydrocarbon radical such as cyclohexyl. W can be, for example, $C_2$-$C_4$ divalent organic group like —$CH_2CH_2$—, —$CH_2(CH_3)$CH—, —$CH_2CH_2CH_2$—, —$CH_2CH_2CH_2CH_2$—, $CH_2(CH_3CH_2)CH$— and —$CH_2CH_2(CH_3)CH$—. The individual $R^{10}$ radicals and D radicals of the maleates and fumarates can be identical or different, as desired. The value of subscript 'h' in the formula immediately above can have a value equal to zero or 1. The individual values of 'h' can be identical or different, as desired.

The amount of inhibitor component E) to be used in the compositions of this invention is not critical and can be any amount that will retard the above-described platinum-catalyzed hydrosilylation reaction at room temperature while not preventing said reaction at moderately elevated temperature. No specific amount of inhibitor can be suggested to obtain a specified bath life at room temperature since the desired amount of any particular inhibitor to be used will depend upon the concentration and type of the platinum group metal-containing catalyst and the nature and amounts of components A2) and B2).

The range of the inhibitor component E) can be 0.0006 to 10% by weight, preferably 0.05 to 2 wt. %, and most preferably 0.1 to 1 wt. % for e.g. alkinoles.

The siloxane compositions according to the invention may also comprise further ingredients, like for example solvents F), added to achieve better process properties for the inventive polymer composition A) to F).

If the compositions of the present invention optionally comprise solvents these solvents are usual organic solvents in the range from about 10% to about 90% by weight, preferably from about 20% to about 60% by weight, and most preferably from 30% to about 50% by weight of an organic solvent. Suitable organic solvents include any of the solvents conventionally used with organosiloxanes and having a boiling point below approximately 300° C., such as aromatic hydrocarbons, e.g., benzene, toluene and xylene; aliphatic hydrocarbons such as hexane, heptane, and cyclohexane, halogenated hydrocarbon solvents such as trichloroethane and chloroform, naphthas such as petroleum ether, and oxygenated solvents such as hydrocarbon ethers, e.g., tetrahydrofuran and the dimethylether of ethylene glycol, ketone such methyl, isobutyl ketone and esters such as ethyl acetate and the like, olefinic hydrocarbons such as alpha-olefins, e.g. C8 to C25 alpha-olefins or preferably C14-C20 alpha-olefins. Mixtures of organic solvents can also be used.

The curable siloxane mixtures for achieving modified release layer properties therefore comprises one of the described release base compositions curable by heat or radiation and a pressure sensitive adhesion component.

After taking into account all disclosed single components one can resume that the curable siloxane compositions of this invention comprise
  A) at least one reactive siloxane polymer,
  B) optionally at least a siloxane crosslinking agent,
  C) at least one component selected from the group of a catalyst, a sensibilizer and a radical initiator,
  D) at least one pressure sensitive adhesive and
  E) optionally auxiliary additives
  F) optionally solvents.

The inventive composition can be composed out of different polymers of the types A), crosslinkers B) catalysts C) and a PSA component D) which are finally curable under the influence of heat or radiation as a layer with modified release properties.

Generally some the reactions e.g. the hydrosilation between A2) and B2) occur also without heat activation saying at room temperature i.e. 25° C. It is therefore necessary to adjust the reactivity to that speed level which is acceptable for an industrial use. For systems using this curing mechanism of the hydrosilylation i.e. a polymer A2), B2) and a catalyst C2) it is preferred to adjust the cure with the inhibitors defined under E). These inhibitors retard the complete cure for hours or days at room temperature but provide sufficient high cure rates at elevated temperatures.

The base systems for the release layer are selected in such a way to receive surfaces with desired releasing properties under the required cure conditions, i.e. low or high temperature. Another aspect of the preselection is the type of the adhesive layer which should be peeled off after cure with respect to the commonly applied adhesives in adhesive labeling systems. The releasing behaviour is defined by properties of the transfer/migration behaviour of different siloxane types, i.e alkyl or fluoroalkyl containing siloxanes, with high or low crosslinking density. The requirements set by the adhesives of the label system can be described by its interaction to the release layer, by its solubility, by migration or by reactivity towards it.

The release layer should provide the optimum balance of the release force level, broad range of comparable release behaviour towards different adhesives and good stability of these effects over time.

The inventive release compositions including the PSA component D) with modified release forces are defined to have release forces of less than 1000 cN/inch in the FINAT-test FTM 3 with e.g. Tesa 7476 preferably the release forces are less than 500 cN/inch.

The PSA itself has a Peel Adhesion measured according to the Finat test method FTM 1 against glass of at least 500 cN/inch preferably more than 700 cN/inch. This invention provides release layers wherein the properties are controlled by the adjustment of the release surface using different amounts and types of a PSA component D) but not primarily by any selection of an appropriate adhesive between the label and the release layer.

The general base system of all 3 embodiments comprises of
  a curable siloxane composition comprising:
  100 p.wt. of component A),
  0 to 20 p.wt of component B),
  1 to 10000 ppm of component c) based on the total weight of the composition,
  0.01 to 10 p.wt of component D).

The base systems for the first embodiment of this invention of a release composition is a polymer mixture which is curable by condensation reactions comprises the components A1), B1) and C1), wherein the first embodiment comprises
  a component A1) selected from SiOH-terminated polydimethylsiloxanes,
  a component B1) selected from SiOR-containing polyorganosiloxanes and SiOR-containing organosilanes, and
  a component C1) is selected from organometallic compounds, Lewis acids, Lewis bases, Broenstedt acids.

Each of the component can be single compounds or mixtures thereof.

In detail such a composition comprises at least of
  100 pt.wt. of a SiOH-terminated polydimethylsiloxanes A1),
  0.1-30 pt. wt. of a SiOR-containing organosiloxanes or organosilanes B1),
  0.001-10 pt.wt. of a catalysts C1) selected from organometallic compounds, Lewis acids, Lewis bases and Broenstedt acids
  0.1-50 pt.wt. of a pressure sensitive adhesive.

The base systems for the second embodiment of this invention of a release composition is a polymer mixture which is curable by an addition reaction comprises the components A2), B2) and C2)
wherein
  component A2) is selected from alkenyl-containing polyorganosiloxanes,
  component B2) is selected from SiH-containing polyorganosiloxanes and SiH-containing organosilanes, and
  component C2) is selected from organometallic hydrosilylation catalysts.

Such a composition comprises of at least
100 pt.wt. of an alkenyl-containing polyorganosiloxanes A2),
0.1-200 pt.wt. of a SiH-containing polyorganosiloxane or SiH-containing organosilanes B2) with proviso that the molar ratio of the alkenyl groups of A2) to the SiH groups of B2) is in the range of 1:0.5 to 20, and
1-10000 ppm of a catalysts C2) selected from organometallic hydrosilylation catalysts related to the sum of A2) and B2)
0.1-50 pt.wt. of a pressure sensitive adhesive D).

The amounts of components A2) and B2) that are used in the compositions of this invention are not narrowly limited. The weight ratio of A2) to B2) can be in the range 1:100 to 100:1. The preferred range is 100:1 to 10 of A2):B2) to achieve a release surface completely cured.

Said amounts of A2) and B2) can be better described and adjusted in terms of the molar ratio of silicon-bonded olefinic hydrocarbon radicals of component A2) to the number of silicon-bonded hydrogen atoms of component B2). The molar ratio of Si-alkenyl:SiH is adjusted between 1:0,5 to 20, preferably 1:0,75 to 10 especially preferred is a ratio of 1:1 to 3.5.

Therefore the weight ratio A2) to B2) depends on the concentration of alkenyl and hydrogen in each of the components of A2) or B2). It is preferred that the vinyl concentration in A2) is smaller than the SiH concentration in B2). The excess of SiH to Si-alkenyl can be useful in getting higher cure rates or getting better anchoring properties on substrate of the carrier for the release layer.

The polyorganosiloxanes A2) and B2) are clearly the most significant and most widely used form of organosilicon polymers in the art for release surfaces, and are commercially manufactured. The preparation of the organosilicone components A2) and B2) that are used in the $2^{nd}$ embodiment of the compositions of this invention is well documented in patents and needs no intensive delineation herein.

The base systems for the third embodiment of this invention of a release composition is a polymer mixture which is curable by radiation, especially UV-radiation, induced photo reactions comprises the components A3), B3) and C3), wherein
component A3) and B3) is selected from photocurable respectively photoactivatable polyorganosiloxanes,
component C3) is selected from the group consisting of photoactivatable catalysts, sensibilizers and radical initiators.

Such a composition comprises of at least
100 pt.wt. of a photo curable polyorganosiloxanes A3),
0-30 pt. wt. of a crosslinking polyorganosiloxane or organosilanes B3)
0.0001-5 pt.wt. of catalysts C3) selected from catalysts, sensibilizers and radical initiators related to the sum of A2) and B2).
0.1-50 pt.wt. of a pressure sensitive adhesive D)

The amounts of components A3) and if necessary B3) that are used in the compositions of this invention are not narrowly limited. In most cases there is no need for a separate component B3). The crosslinking properties can be achieved by a polymer A3) with higher multiple functionality. The functionality is limited by the desired release properties. In order keep the release forces below the defined value the concentration of epoxy units should be preferable smaller than 16 wt. %.

The selection of catalyst and sensitizers can be done with respect to solubility of these components and the achievable cure rate under the manufacturing conditions, i.e. curing time, temperature and radiation energy per time and surface.

The polyorganosiloxanes A3) are commercially prepared and available. Such systems are best choice if a low temperature curing process is a must. Such processes are preferred when the release carrier is temperature sensitive.

The preparation of the organosilicone components A3) and C3) that are used in the 3rd embodiment of a composition of this invention is well documented in patents and needs no intensive delineation herein.

The modified higher release force comprising the use of at least one pressure sensitive adhesive as controlled release agent for siloxane-based release compositions.

The process for modifying the surface properties of cured siloxane compositions which comprises adding at least one pressure sensitive adhesive to a curable siloxane composition and curing the resulting composition.

The process for the coating a substrate, comprising the steps of:
applying the composition with the components A) to F) onto the surface of the substrate, and
curing said composition on the surface of the substrate.

The cured siloxane composition, as obtained by curing the composition defined above show the inventive modified release behaviour.

The curing condition depends on each system. With the exception of some radically cured system the cure can be made in the presence of ambient air at temperature between 0 to 200° C. One preferred version of release surface is the usage of thin release films carried by papers or thermoplastic foils. Such release films or layers are characterized by a thickness of some microns or 0.5 to 2 g/m² of siloxane.

Herein the term "curable" as applied to compositions of this invention generally denotes a chemical change, which leads to a change in the state of the composition from a liquid to a solid.

The use of the composition with components A) to F) for the coating of substrate achieves surfaces with modified release forces.

This means the use of at least one pressure sensitive adhesive as controlled release agent for siloxane-based release compositions.

These compositions are useful in the preparation of release films with modified surfaces properties.

In addition one can modify also other substrate, comprising the composition on the surface thereof to achieve a modified surface not only for thin films.

One preferred release film application is a multi-layered product comprising a release sheet comprising a carrier and a release film and an adhesive sheet comprising of a carrier such as a label and an adhesive film, said release film is formed of the inventive composition, and being in contact with the adhesive film of a carrier.

EXAMPLES

General description for the base composition comprising the components A2), B2), C2) E2) and F2):

All examples contain 100 p.wt. a base polymer A2) which is a vinyl end-stopped polydimethylsiloxane of around 250 mPa·s at 25° C. and a shear rate of D=1 s$^{-1}$.

The vinyl content is 0.23 mmol/g. To all formulations 3.0 pt.wt. a polymethylhydrogensiloxane B2) is added which is a trimethylsilyl terminated homopolymer by equilibration of around 25 mPa·s having 1.6 wt. % hydrogen available under SS 4300 c from GE Bayer Silicones GmbH & Co KG Leverkusen to provide a SiH:SiVi ratio of 2.2:1. In addition there was used 68.7 mg of a platinum catalyst C2) which is a Pt-Karstedt catalyst (Pt$^0$-divinyltetramethyidisiloxane complex) providing 100 ppm of Pt related to the sum of the components A2) to D) as a solution of 15% Pt in polymer A2) and 0.4% of diallylmaleate as component E) wherein all components are mixed to the formulations evaluated in the table 1 to 5.

The procedure of mixing the single components include preparing at first a catalyst composition with 10 wt. % of the polymer A2) and the inhibitor E) as mixture X1) and a mixture X2) including 90 wt. % of A2) which contains the crosslinker B2). The total composition is realized by bringing both premixes together at 25 to 35° C. mixing them with a stirrer.

The component D), the PSA or the comparative material a CRA, were mixed to this base composition in the relations shown in each of tables 1 to 5 following below.

viscosity of about 10 cSt measured as solution of 60 wt. % resin solids in toluene, the number average mol weight is 3000-5000 g/mol by GPC versus polystyrene as standard, a M:Q-ratio of 0.7:1 and a silanol content of ca. 1.9 wt. % with the precursor [V] which is an OH-stopped polydimethylsiloxane gum having a viscosity of around 950,000 mPa·s in which the resin to gum weight ratio (MQ:D) was set to 1.44 whereas the molar ratio D:Q is 1.095:1.

The component D) of the present invention are prepared by heating to reflux at a temperature of 130° C., and cooking for about three hours a mixture of the resin [H], silicone polymer gum [V] and toluene as solvent (64 wt. %) in the presence of 40-60 ppm NaOH catalyst, introduced as aqueous 10% solution. The water formed during the condensation reaction is then removed by distillation. The resulting mixture is cooled to 80° C., the mixture is neutralized with an excess of $H_3PO_4$ in isopropyl alcohol acid to get an excess acid equivalent of 5-15 ppm HCl. After adding Ce-octoate to a level of 50 ppm Ce per silicone solids the toluene was removed and the fluid was cooled to 30° C. The previous solvent is replaced by a C14-alpha-olefin in order to prepare the product as a solution of 50% solids to be tested in table 1.

TABLE 1

Inventive release formulations with PSA

| | Release layer | | | | |
| --- | --- | --- | --- | --- | --- |
| | Component | Release force versus adhesives | | | |
| Example Formulation | [%] D) per Sum (A) – D)) | T4651 [cN/inch] | T7475 [cN/inch] | T7476 [cN/inch] | Hotmelt)* [cN/inch] |
| 1.1 | 0 | 6 | 25 | 32 | 4 |
| 1.2 | 3 | 15 | 32 | 80 | 11 |
| 1.3 | 5 | 20 | 44 | 87 | 18 |
| 1.4 | 10 | 47 | 67 | 99 | 56 |
| 1.5 | 20 | 146 | 32 | 140 | 351 |
| 1.6 | 30 | 227 | 78 | 129 | 528 |

After thoroughly mixing the composition A2) to F), it was applied on a standard glassine (Silca 2010, 62 grams per square meter from Ahlstrom) by a knife and cured at 120° C. for 30 seconds in an oven providing a non-smear, non-migrating coating on paper. The coat weight was adjusted to around 1.5 grams per square meter.

Test tapes as mentioned in Table 1 to 5 were applied on the coatings after which the laminate was aged for 24 hours at room temperature for Tesa 4651 (1 inch) and Tesa 7476 (1 inch) and Hot melt tape (2 inch) Takstrip commercially available from Wiggins Teape Packaging and at 70° C. for Tesa 7475 (1 inch). The release forces in cN/inch were measured by peeling off the tapes from the coating at an angle of 180 degrees with a speed of 300 mm/min.

Example 1

The formulations 1.1 to 1.6 of this example contain different amounts of a PSA no. 1 as component D) as shown in Table 1. In these examples the component D) is the condensation product of the MQ-resin [H] a precursor having a Example 2

Comparison Example with a Commercially Available CRA-Resin

The formulations 2.7 to 2.9 contain different amounts of a commercially available CRA E as a non inventive component D), which is a mixture containing 60% of $MD_{vi}Q$-resin in a ratio of the $MD_{vi}Q$ units 0.6:0.1:1.0 and 0.25 wt. % SiOH in xylene, having a viscosity of ca. 10 cSt and an average number mol weight of 3000-5000 g/mol. This solution was transferred in a second composition consisting of 35 weight-% solids D) in alpha-C18-olefins. The molar ratio of D:Q is 0,1:1.

After thoroughly mixing the formulation, it was applied on a standard glassine (Silca 2010, 62 g/m$^2$ from Ahlstrom) by a knife and cured at 120° C. for 30 seconds in an oven providing a non-smear, non-migrating coating. The coat weight was adjusted to around 1.5 g/m$^2$.

TABLE 2

| | Release layer | | | | |
|---|---|---|---|---|---|
| | Component | Release force versus adhesives | | | |
| Example Formulation | [%] D) per Sum(A) – D)) | T4651 [cN/inch] | T7475 [cN/inch] | T7476 [cN/inch] | Hotmelt)* [cN/inch] |
| 2.7 | 10 | 5 | 30 | 60 | 6 |
| 2.8 | 30 | 12 | 69 | 107 | 15 |
| 2.9 | 50 | 37 | 159 | 148 | 89 |

The formulations of this example show that the commercially available CRA E as component D) having a structure comprising mainly MQ units which is different to the inventive component D) and is less efficient than the PSA of example 1.

Example 3

The formulations 3.10 to 3.14 of this example contain different amounts of the component D) represented by the PSA no. 2 as mentioned in Table 3.

In these examples the component D) is the condensation product of the MQ-resin having a viscosity of about 6 cSt measured as solution of 60 wt. % resin solids in toluene, a M:Q-ratio of 0.9 and a silanol content of ca. 1.9 wt. % and an OH-stopped polydimethylsiloxane gum having a viscosity range of from around 17,500,000 mPa·s in which the resin to gum weight ratio was set at 1.5, i.e. the molar ratio is D:Q=1.2:1. The condensation product is used as a 50% solids solution in C18-alpha-olefin.

TABLE 3

| | Release layer | | | | |
|---|---|---|---|---|---|
| | Component | Release force versus adhesives | | | |
| Example Formulation | [%] D) per sum(A) – D)) | T4651 [cN/inch] | T7475 [cN/inch] | T7476 [cN/inch] | Hotmelt)* [cN/inch] |
| 3.10 | 3 | 6 | 32 | 42 | 7 |
| 3.11 | 5 | 7 | 34 | 47 | 9 |
| 3.12 | 10 | 10 | 34 | 49 | 14 |
| 3.13 | 20 | 25 | 41 | 57 | 27 |
| 3.14 | 30 | 45 | 40 | 66 | 50 |

The above mentioned PSA is less efficient than component D) in the example 1. The component D) (PSA) of this example contains 23.5 mol % Q and the gum type of precursor V has a higher chain length and therefore a smaller SiOH concentration. The resin differs in addition by its viscosity, which is here only around 6 cSt, while the resin in example 1 and others are around 10 cSt.

Such MQD structure is less preferred than that one of example 1 and its ranges for the component D) thereof.

Example 4

The formulations 4.15 to 4.18 of this example contain different amounts of component D) of the PSA no. 3 and 4 as mentioned in Table 4

The condensation or reaction product used as component D) is prepared of a MQ-resin of example 1 having a viscosity of about 10 cSt measured as 60% resin solids in toluene, a M:Q-ratio of 0.7 and a silanol content of ca. 1.9%. The precursor component of V is a vinyl-stopped polydimethylsiloxane gum having a viscosity of around 25,000,000 mPa·s at 25° C. in which the resin to gum weight ratio was set to 1.65. The precursor for the unit V does not show substantially measurable amounts of SiOH, i.e<0.05 wt. %. The condensation product is used as a solution of 50% solids in C18-alpha-olefin.

In examples 4.17 and 4.18 the composition of the unreacted component D) is the same as component D) in the examples 4.15 and 4.16 but with the exception that no polymerization reaction has been carried out in before between the starting products H and V of the component D) like in 4.15 and 4.16 before mixing it with A2) and B2).

The molar ratio of D:Q of this example is D:Q=0.96:1.

TABLE 4

| | Release layer | | | | |
|---|---|---|---|---|---|
| | Component | Release force versus adhesives | | | |
| Example Formulation | [%] D) per sum(A) – D)) | T4651 [cN/inch] | T7475 [cN/inch] | T7476 [cN/inch] | Hotmelt)* [cN/inch] |
| 4.15 | 10 | 11 | 24 | 57 | 13 |
| 4.16 | 20 | 38 | 33 | 62 | 37 |
| 4.17 | 10 | 13 | 22 | 50 | 13 |
| 4.18 | 20 | 38 | 32 | 59 | 26 |

The differences in between examples 4.15-4.16 and 4.17-4.18 are not as big as between all examples 4 compared those of example 2.

Example 5

The formulations 5.19 to 5.22 of this example contain different amounts of the component D) represented by the PSA no. 5 and 6 as mentioned in Table 5.

The condensation or polymerization reaction product in examples 5.19 and 5.20 as component D) is prepared out of a MQ-resin of example 1 having a viscosity of about 10 cSt measured as solution of 60% resin solids in toluene, a molar M:Q-ratio of 0.7 and a silanol content of ca. 1.9 wt.-%. The component V is a vinyl-stopped polydimethylsiloxane gum having a viscosity of around 25,000,000 mPa·s in which the resin to gum ratio was set to 4.0. The component V does not show substantially measurable amounts of SiOH. The condensation product is used as a solution of 50% solids in C18-alpha-olefin.

In examples 5.21 and 5.22 of the composition of the component D) is the same as component D) in the examples 5.19 and 5.20 but with the exception that no polymerization reaction according to that of example 1 applied on the precursors of component D) has been carried out in before between the starting products H and V of the component D) in before mixing it with A2) and B2).

The molar ratio D:Q of this example is D:Q=0.4:1.

TABLE 5

| | Release layer | | |
|---|---|---|---|
| | Component [%] D) | Release force versus adhesives | |
| Example Formulation | per sum(A) – D)) | T4651 [cN/inch] | T7475 [cN/inch] |
| 5.19 | 20 | 26 | |
| 5.20 | 50 | 230 | 74 |
| 5.21 | 20 | 25 | |
| 5.22 | 50 | 168 | 58 |

The release forces in table 5 show that the release forces for tape 4651 and 7475 of the reaction product of component D) according of the formulation 5.20 in the example 5 are higher than the release forces of formulation 5.22 in example 5 and than formulation 2.8 of example 2 (comparison) where the pure untreated MQ resin is used as it is.

Example 6

Comparison

The example 6 shows the properties of a release composition with a PSA wherein the component D) is the reaction product of a polydiorganosiloxane copolymer with phenyl groups. The component D) was prepared as a condensation product of the MQ-resin having a viscosity of about 10 cSt measured as 60 wt. % resin solids in toluene, a M:Q-ratio of 0.7:1 and a silanol content of ca. 1.9 wt. %. This resin solved as described was brought into reaction with an OH-stopped polydiphenyidimethylsiloxane gum ($Phe_2SiO:Me_2SiO=1:6$, with 29.9 wt. % diphenylsiloxy (13.7 mol-% phenyl of all organic C-residues) and a polymerisation degree of 239 having a viscosity range of from around 50,000,000 mPa·s in which the resin to gum weight ratio was set at 1.25 wherein the molar ratio D:Q is then 1,03:1 named PSA 6574. The condensation product was then used as 55% solids solution in C14-alpha-olefin. It was observed that a clear solution of the composition of the components A) to E) is not available and that nearly a complete separation remained even after long stirring under a high shear force. Therefore no paper coatings with a homogenous release layer as described in example 1 could be produced and evaluated.

This example shows that minimum of miscibility with the mixture of the release components A2) B2) and C2) seems to be necessary as long as the mixture is not cured. The PSA of this example does not work well, because it can not homogenously incorporated in the composition.

The invention claimed is:
1. A curable siloxane composition comprising:
(a) 100 parts by weight of component A), where component A) is at least one reactive alkenyl-containing polyorganosiloxane polymer, wherein the content of the T- and Q-units if present does not exceed 10 mol-% of all siloxy units,
(b) 0 to 20 parts by weight of component B), wherein component B) is at least one siloxane cross-linking agent,
(c) 1 to 10,000 ppmw of component C), based on the total weight of components A), B), C), D), E) and F), wherein component C) is a catalyst,
(d) 0.01 to 10 parts by weight of component D), where component D) is at least one organosilicone pressure sensitive adhesive, wherein the content of the total of T- and Q-units is more than 10 mol-% of all siloxy units, the content of D-units is more than 10 mol-% of all siloxy units, and at least 90 mol-% of the organo groups in the organosilicone compound are alkyl groups, wherein D)

is selected from non-reactive polyorganosiloxanes with respect to components A) and B), (e) optionally auxiliary additives E), and (f) optionally solvents F).

2. The curable siloxane composition according to claim 1, wherein component A) is selected from alkenyl-containing polyorganosiloxanes, component B) is selected from SiH-containing polyorganosiloxanes and SiH-containing organosilanes, and component C) is selected from organometallic hydrosilylation catalysts.

3. The curable siloxane composition according to claim 2, wherein the component D) is selected from a polyorganosiloxane which is a reaction product between a resinous prepolymer comprising at least M- and at least Q-units and a gumlike prepolymer comprising at least D-units.

4. The curable siloxane composition according to claim 2, wherein in component D) the molar ratio of D:Q is greater than one.

5. The curable siloxane composition according to claim 1, wherein the component D) is selected from a polyorganosiloxane which is a reaction product between a resinous prepolymer comprising at least M- and at least Q-units and a gumlike prepolymer comprising at least D-units.

6. The curable siloxane composition according to claim 5, wherein in component D) the molar ratio of D:Q is greater than one.

7. The curable siloxane composition according to claim 1, wherein in component D) the molar ratio of D:Q is greater than one.

8. The curable siloxane composition according to claim 1, wherein component D) is selected from polyorganosiloxanes comprising at least one M unit at least one Q unit, and at least one D unit, wherein the ratio of the siloxane units D to Q is greater than 1.

9. Curable siloxane composition according to claim 1, wherein component D) is selected from polyorganosiloxane block copolymers.

10. A multi-layered product comprising:

(a) a release sheet comprising
  (i) a carrier and a release film and
  (ii) an adhesive sheet comprising
    a. a carrier and
    b. an adhesive film, wherein
said release film is formed of the composition of claim 9, and wherein said release film is in contact with the adhesive film.

11. A cured siloxane composition, obtained by curing the composition according to claim 1.

12. A substrate, comprising the composition according to claim 11 on the surface thereof.

13. A process for coating a substrate, comprising
(a) applying the composition according to claim 1 onto the surface of the substrate, and
(b) curing said composition on the surface of the substrate.

14. A process of coating a substrate, comprising applying to the substrate the composition of claim 1.

15. A process of preparing release films, comprising applying to a substrate to be released, the composition of claim 1.

* * * * *